(12) United States Patent
Kiuchi et al.

(10) Patent No.: US 10,850,335 B2
(45) Date of Patent: Dec. 1, 2020

(54) CUTTING INSERT AND CUTTING EDGE-INTERCHANGEABLE ROTARY CUTTING TOOL

(71) Applicant: Mitsubishi Hitachi Tool Engineering, Ltd., Tokyo (JP)

(72) Inventors: Yasuhiro Kiuchi, Narita (JP); Yoshiyuki Kobayashi, Narita (JP); Takao Nakamigawa, Narita (JP)

(73) Assignee: MITSUBISHI HITACHI TOOL ENGINEERING, LTD., Tokyo (JP)

( * ) Notice: Subject to any disclaimer, the term of this patent is extended or adjusted under 35 U.S.C. 154(b) by 0 days.

(21) Appl. No.: 16/339,064

(22) PCT Filed: Oct. 19, 2017

(86) PCT No.: PCT/JP2017/037819
§ 371 (c)(1),
(2) Date: Apr. 3, 2019

(87) PCT Pub. No.: WO2018/074542
PCT Pub. Date: Apr. 26, 2018

(65) Prior Publication Data
US 2020/0038972 A1  Feb. 6, 2020

(30) Foreign Application Priority Data
Oct. 21, 2016 (JP) ................. 2016-206988

(51) Int. Cl.
*B23C 5/02* (2006.01)
*B23C 5/20* (2006.01)
*B23C 5/10* (2006.01)

(52) U.S. Cl.
CPC ............ *B23C 5/207* (2013.01); *B23C 5/1027* (2013.01); *B23C 2200/203* (2013.01)

(58) Field of Classification Search
CPC ....... B23C 5/10; B23C 5/1027; B23C 5/1036; B23C 5/20; B23C 5/207; B23C 2200/203
See application file for complete search history.

(56) References Cited

U.S. PATENT DOCUMENTS

| 6,158,927 A | * | 12/2000 | Cole ..................... B23B 51/048 |
|---|---|---|---|
| | | | 407/113 |
| 2006/0093445 A1 | * | 5/2006 | Tsuchitani ............ B23C 5/1036 |
| | | | 407/54 |

(Continued)

FOREIGN PATENT DOCUMENTS

| CN | 102292196 A | 12/2011 |
|---|---|---|
| CN | 103945968 A | 7/2014 |

(Continued)

OTHER PUBLICATIONS

Notice of Allowance dated Jun. 12, 2019, issued for the Korean patent application No. 10-2019-7010839 and English translation thereof.

(Continued)

*Primary Examiner* — Nicole N Ramos
(74) *Attorney, Agent, or Firm* — Locke Lord LLP

(57) ABSTRACT

This cutting insert has: as cutting edges, arcuate cutting edges that are of an arc shape protruding toward an outer circumference side of a distal end. A chisel part is formed at an intersecting ridge line part between the flank faces of the pair of arcuate cutting edges. A round honing is formed on the cutting edge tip of the arcuate cutting edge at least in a range where a radial angle is 30° or less. A curvature radius of the round honing in a cross section perpendicular to the edge length direction of the arcuate cutting edge is 20 to 40 μm. A chisel angle formed between the distal end part of the arcuate cutting edge and a chisel edge of the chisel part is 150° to 170° as seen in an insert front view.

20 Claims, 10 Drawing Sheets

(56) References Cited

U.S. PATENT DOCUMENTS

| | | | |
|---|---|---|---|
| 2011/0008112 A1* | 1/2011 | Abe | B23C 5/20 |
| | | | 407/42 |
| 2011/0305533 A1 | 12/2011 | Kisselbach et al. | |
| 2013/0336731 A1* | 12/2013 | Nagashima | B23C 5/1036 |
| | | | 407/40 |
| 2015/0258617 A1 | 9/2015 | Kiuchi et al. | |

FOREIGN PATENT DOCUMENTS

| | | | |
|---|---|---|---|
| JP | 11-104913 A | 4/1999 |
| JP | 2000-233311 A | 8/2000 |
| JP | 2002-126929 A | 5/2002 |
| JP | 2003-191118 A | 7/2003 |
| JP | 2003-191119 A | 7/2003 |
| JP | 2004-291096 A | 10/2004 |
| JP | 2005-502483 A | 1/2005 |
| JP | 2008-012610 A | 1/2008 |
| JP | 2008-302456 A | 12/2008 |
| JP | 2009-107046 A | 5/2009 |
| JP | 2010-030044 A | 2/2010 |
| JP | 2010-105093 A | 5/2010 |
| JP | 2012-006134 A | 1/2012 |
| JP | 2012-045705 A | 3/2012 |
| JP | 2012-183597 A | 9/2012 |
| JP | 2014-042981 A | 3/2014 |
| JP | 2014-091168 A | 5/2014 |
| JP | 2015-030073 A | 2/2015 |
| JP | 2015-100881 A | 6/2015 |
| KR | 10-2015-0040809 A | 4/2015 |
| WO | 03/024650 A1 | 3/2003 |
| WO | 2009/060833 A1 | 5/2009 |
| WO | 10/062411 A1 | 6/2010 |
| WO | 2014/057783 A1 | 4/2014 |

OTHER PUBLICATIONS

Office Action dated Nov. 7, 2019, issued for the Chinese patent application No. 201780062904.9 and English translation thereof.
International Search Report dated Dec. 12, 2017, issued for PCT/JP2017/037819 and English translation thereof.
International Preliminary Report on Patentability dated Nov. 27, 2018, issued for PCT/JP2017/037819 and English translation thereof.
Search Report dated Jun. 4, 2020, issued for European patent application No. 17862245.2.
Notice of Allowance dated Feb. 25, 2020 issued for the Japanese patent application No. 2018-546396 and English translation thereof.

* cited by examiner

CUTTING INSERT AND CUTTING EDGE-INTERCHANGEABLE ROTARY CUTTING TOOL

TECHNICAL FIELD

The present invention relates to a cutting insert and a cutting edge-interchangeable rotary cutting tool furnished with the cutting insert, for performing cutting work such as semi-finishing processing and finishing processing on a workpiece.

Priority is claimed on Japanese Patent Application No. 2016-206988, filed Oct. 21, 2016, the contents of which are incorporated herein by reference.

BACKGROUND ART

Conventionally, when cutting processing such as semi-finishing processing or finishing processing is performed on a workpiece such as cast iron used for a press die or the like, a cutting edge-interchangeable ball end mill such as one described in Patent Document 1 below is used.

The cutting edge-interchangeable ball end mill includes: a tool main body that is rotated about a center axis; a slit-like mounting seat formed at a distal end part in the direction of the center axis of the tool main body; and a plate-shaped cutting insert that is detachably attached to the mounting seat and that has cutting edges;

The cutting edges are each formed on an intersecting ridge line between a rake face and a flank face, and each has an arcuate cutting edge that protrudes toward the outer circumferential side of the distal end of the tool. In the cutting insert, the arcuate cutting edges are formed in a pair 180° rotationally symmetric about the center axis, A rotation locus formed by rotating these arcuate cutting edges about the center axis has a hemispherical surface that protrudes toward a tool distal end side.

PRIOR ART DOCUMENTS

Patent Documents

[Patent Document 1] Japanese Unexamined Patent Application, First Publication No. 2004-291096

SUMMARY OF INVENTION

Problems to be Solved by the Invention

However, the conventional cutting edge-interchangeable ball end mill has the following problem.

For example, there are cases where high efficiency machining for performing cutting work of high cutting depth and high feed rate is required for a workpiece of a high hardness material such as cast iron that has undergone a quenching treatment. Also, a workpiece such as a press die having intermittent irregularities, holes, and the like requires high efficiency machining by means of intermittent machining There is a room for improvement in preventing chipping of the cutting edge and prolonging the life of the tool while maintaining excellent surface properties of the worked surface of the workpiece (precision of the worked surface), during high efficiency machining of such a high hardness material.

The present invention takes the above circumstances into consideration, with an object of providing a cutting insert and a cutting edge-interchangeable rotary cutting tool that uses the cutting insert, that is capable, even when used for high efficiency machining on a high hardness material, of maintaining excellent precision of the worked surface and preventing chipping to thereby prolong the life of the tool.

Means for Solving the Problem

An aspect of the present invention is a plate-shaped cutting insert detachably mounted on a distal end part of a tool main body that is rotated about a center axis, the cutting insert including: rake faces; flank faces; and cutting edges formed on an intersecting ridge line between the rake faces and the flank faces. The cutting edges each have an arcuate cutting edge that is of an arc shape protruding toward an outer circumference side of a distal end of the cutting insert; the arcuate cutting edges are formed in a pair 180° rotationally symmetric about the center axis, a chisel part is formed at an intersecting ridge line part between the flank faces of the pair of arcuate cutting edges; when projecting, on a reference plane including a predetermined point on the arcuate cutting edge and the center axis, an imaginary straight line passing through an arc center point of the arcuate cutting edge and the predetermined point, an angle at which the imaginary straight line is inclined with respect to the center axis in the reference plane is defined as a radial angle; a round honing is formed on a cutting edge tip of the arcuate cutting edge at least in a range where the radial angle is 30° or less; a curvature radius of the round honing in a cross section perpendicular to the edge length direction of the arcuate cutting edge is 20 to 40 µm; and a chisel angle formed between the distal end part of the arcuate cutting edge and a chisel edge of the chisel part is 150° to 170° as seen in an insert front view of the cutting insert viewed from the distal end toward the proximal end side in the center axis direction.

Moreover, another aspect of the present invention is a cutting edge-interchangeable rotary cutting tool including: a tool main body that is rotated about a center axis; a mounting seat formed at a distal end part in a direction of the center axis of the tool main body; and a cutting insert that is detachably attached to the mounting seat and that has cutting edges; wherein the cutting insert mentioned above is used as the cutting insert.

In the cutting insert and the cutting edge-interchangeable rotary cutting tool of the present invention, a round honing is formed on the arcuate cutting edge at least in a range where the radial angle is 30° or less.

More specifically, the round honing is formed in the arcuate cutting edge, particularly in a region from the vicinity of the distalmost end in the center axis direction (radial angle is around 0°) where chipping can occur easily in the cutting edge tip at time of high efficiency machining or the like on a high hardness material, to the area where the radial angle is 30° (hereinafter, referred to as the vicinity of the distal end part of the arcuate cutting edge) and is subjected to round honing. A curvature radius of the round honing in a cross section perpendicular to an edge length direction of the arcuate cutting edge (in a cross section perpendicular to the cutting edge) is 20 to 40 As a result, it is possible to prevent chipping of the arcuate cutting edge and the chisel part that continues to the distal end side therefrom while sufficiently increasing the precision of a worked surface of a workpiece.

Specifically, since the curvature radius of the round honing of the arcuate cutting edge is 20 µm or more, even in the case of, for example, performing high efficiency machining including semi-finishing processing or the like by means of intermittent processing on a high hardness workpiece such as cast iron that has been subjected to a quenching treatment, the strength of the cutting edge in the vicinity of the distal end part of the arcuate cutting edge is sufficiently ensured and chipping is prevented. In other words, by appropriately rounding the cutting edge tip of the arcuate cutting edge, chipping or the like in the cutting edge tip due to shocks or excessive biting at the time of coming into contact with the workpiece is suppressed.

On the other hand, when the curvature radius of the round honing of the arcuate cutting edge is less than 20 µm, the cutting edge tip strength in the vicinity of the distal end part of the arcuate cutting edge cannot be ensured and chipping can easily occur during the high efficiency processing as described above.

In addition, since the curvature radius of the round honing of the arcuate cutting edge is 40 µm or less, the cutting edge tip of the arcuate cutting edge can be kept sharp, and the sharpness is ensured, and even during high efficiency processing as described above, excellent surface quality of the worked surface of the workpiece is maintained.

On the other hand, when the curvature radius of the round honing of the arcuate cutting edge exceeds 40 µm, cutting performance of the arcuate cutting edge is reduced, which affects the surface quality of the worked surface of the workpiece.

Moreover, a chisel angle formed between the distal end part of the arcuate cutting edge and a chisel edge of the chisel part is 150° to 170° as seen in an insert front view of the cutting insert viewed from the distal end toward the proximal end side in the center axis direction. As a result, it is possible to prevent chipping in the vicinity of the chisel part while increasing the precision of a worked surface of a workpiece.

Among an acute angle and an obtuse angle formed by the arcuate cutting edge and the chisel edge intersecting with each other as seen in the insert front view, the chisel angle above refers to an angle of the obtuse angle.

Specifically, since the chisel angle is 150° or more, it is possible to keep the inclination of the chisel edge with respect to the distal end part of the arcuate cutting edge from becoming excessively steep, and prevent formation of a portion that bends precipitously (bent portion) in a connecting portion between the arcuate cutting edge and the chisel edge, thereby preventing chipping caused by concentrated stress in this bent portion. Moreover, when the chisel angle is 150° or more, it is easy to ensure the length of the chisel part (the length along the edge length direction of the distal end part of the arcuate cutting edge). Therefore, it becomes easier to ensure a capacity of a recess part (a pocket adjacent to the chisel part) for temporarily holding cutting chips discharged from the distal end part of the arcuate cutting edge. As a result, even at the time of high efficiency machining as described above, excellent performance of discharging cutting chips generated from the distal end part and the like of the arcuate cutting edge is maintained, and chipping in the vicinity of the chisel part due to chip clogging is prevented.

On the other hand, when the chisel angle is less than 150°, the bent portion tends to be formed and chipping caused by the bent portion is likely to occur. Also, the length of the chisel part is reduced, and cutting chips generated from the distal end part and the like of the arcuate cutting edge cannot be stably discharged, so that chipping is likely to occur in the vicinity of the chisel part.

Moreover, since the chisel angle is 170° or less, it is possible to keep the inclination of the chisel edge with respect to the distal end part of the arcuate cutting edge from becoming excessively gradual, and thereby reduce the length of the chisel edge (the length in the ridge line direction of the chisel edge). When the length of the chisel edge is kept short, the rotation locus about the center axis of the arcuate cutting edge can be brought closer to the desired hemispherical surface (in particular, it becomes easier to coincide the rotation locus in the vicinity of the distalmost end of the arcuate cutting edge with the hemispherical surface), and it is possible to keep the R precision of the arcuate cutting edge (the amount of actual deviation in which the arcuate cutting edge is protruded or recessed in the radial direction with respect to the desired hemispherical surface) within a range of $\gamma 5$ µm.

On the other hand, when the chisel angle exceeds 170°, the inclination of the chisel edge with respect to the distal end part of the arcuate cutting edge becomes excessively gradual, and as a result, the length of the chisel edge becomes long, making it impossible to maintain excellent R precision of the arcuate cutting edge. Therefore, the precision of the worked surface of the workpiece is influenced.

As described above, according to the present invention, even when used for high efficiency machining on a high hardness material, it is possible to maintain excellent precision of the worked surface and prevent chipping, thereby prolonging the life of the tool.

Furthermore, in the above cutting insert, it is preferable that the curvature radius of the round honing gradually decreases from the distalmost end toward the outermost circumferential point side along the edge length direction of the arcuate cutting edge.

As a result of earnest research by the inventors of the present invention, it has been found that, when using the cutting insert for high efficiency machining, it is the most difficult to ensure the cutting edge tip strength in the vicinity of the distal end part of the arcuate cutting edge (that is, chipping is the most likely to occur), and it becomes easier to ensure the cutting edge tip strength from the distalmost end toward the outermost circumferential point side along the edge length direction of the arcuate cutting edge (that is, chipping is less likely to occur). Also, it has been confirmed that if chipping occurs to the distal end part of the arcuate cutting edge, chipping is also likely to occur in the chisel part that continues to the distal end side of the arcuate cutting edge.

Therefore, by gradually reducing the curvature radius of the round honing from the distalmost end toward the outermost circumferential point side along the edge length direction of the arcuate cutting edge as in the above configuration, it is possible, in the vicinity of the distal end part of the arcuate cutting edge, to ensure sufficient cutting edge tip strength while maintaining the precision of the worked surface and significantly prevent chipping in the region from the distal end part of the arcuate cutting edge to the chisel part. In addition, in the region closer to the outermost circumferential point side than the vicinity of the distal end part along the edge length direction of the arcuate cutting edge, it is possible to further improve the precision of the worked surface by gradually reducing the curvature radius of the round honing.

Moreover, in the above cutting insert, it is preferable that the round honing is formed over the entire region in an edge length direction of the arcuate cutting edge.

In this case, an effect is obtained in which chipping of the cutting edge tip can be prevented over the entire region in the edge length direction of the arcuate cutting edge, and it is possible to meet needs of various types of cutting modes.

Also, in the above cutting insert, it is preferable that the tool cutting edge diameter D (mm) of the cutting insert is 6 to 50 mm, and as seen in the insert front view, a chisel thickness L1 (mm) along a width direction of the chisel part perpendicular to the edge length direction of the distal end part of the arcuate cutting edge satisfies $0.007 \times D \leq L1 \leq 0.024 \times D$.

In this case, the tool cutting edge diameter D (mm) of the cutting insert is 6 to 50 mm and the chisel thickness L1 (mm) of the chisel part satisfies $0.007 \times D \leq L1 \leq 0.024 \times D$. Therefore excellent precision of the worked surface can be maintained while improving chipping resistance properties in the vicinity of the chisel part.

Specifically, since the tool cutting edge diameter D (mm) of the cutting insert is 6 to 50 mm and the chisel thickness L1 (mm) of the chisel part is $0.007 \times D$ (mm) or more, the strength of the chisel part is sufficiently enhanced and chipping of the chisel part is more effectively prevented.

Also, since the tool cutting edge diameter D (mm) of the cutting insert is 6 to 50 mm and the chisel thickness L1 (mm) of the chisel part is $0.024 \times D$ (mm) or less, it is possible to keep the chisel part from becoming excessively thick and the length of the chisel edge from becoming excessively long, thereby preventing the chisel edge from influencing the precision of the worked surface.

In the above cutting insert, it is preferable that, as seen in the insert front view, a linear ridge line part extending on an extension line of the arcuate cutting edge along the edge length direction of the distal end part of the arcuate cutting edge is formed on the chisel part, and a chisel intersection amount, which is a distance from an end edge on the side opposite to the distalmost end of the arcuate cutting edge in the ridge line part along the edge length direction to the central axis is 0.10 to 0.20 mm.

In this case, since the chisel intersection amount is 0.10 to 0.20 mm, it is possible to prevent chipping in the vicinity of the chisel part while maintaining excellent precision of the worked surface of the workpiece.

Specifically, since the chisel intersection amount is 0.10 mm or more, it is possible to ensure a sufficient capacity of a recess part (a pocket adjacent to the chisel part) for temporarily holding cutting chips discharged from the distal end part and the like (the vicinity of the distalmost end) of the arcuate cutting edge. As a result, even at the time of high efficiency machining, excellent performance of discharging cutting chips generated from the distal end part and the like of the arcuate cutting edge is maintained, and chipping in the vicinity of the chisel part due to chip clogging is prevented.

Furthermore, since the chisel intersection amount is 0.20 mm or less, it is possible to keep the length of the chisel edge from becoming excessively long along with the chisel intersection amount, and to maintain excellent R precision of the arcuate cutting edge. Therefore, excellent precision of the worked surface of the workpiece can be maintained.

Moreover, in the above cutting insert, it is preferable that the pair of the arcuate cutting edges are connected to both ends of the chisel edge in the ridge line direction, and the clearance angle of the chisel edge gradually becomes greater from one arcuate cutting edge of the pair of arcuate cutting edges having a flank face in common with the flank face of the chisel edge, toward the other arcuate cutting edge side along the ridge line direction.

In this case, during cutting processing, in a flank face region of the chisel edge (an area of the chisel part adjacent to the side opposite to the tool rotation direction of the chisel edge), the clearance angle of the chisel edge decreases from the center axis toward the end edge side of the chisel edge along the ridge direction of the chisel edge. That is to say, in the chisel edge, as it gets closer to the end edge in the ridge line direction where the circumferential velocity (the velocity about the center axis) becomes faster at the time of cutting processing and the resistance received from the workpiece also tends to become greater, it is possible to ensure a large (thick) back metal in the flank face region of the chisel edge. As a result, the strength of the chisel part can be increased, thereby preventing chipping thereto.

In this case, in a rake face region of the chisel edge (an area of the chisel part adjacent to the chisel edge in the tool rotation direction), the rake angle of the chisel edge decreases from the center axis toward the end edge side of the chisel edge along the ridge direction of the chisel edge. That is to say, in the chisel edge, as it gets closer to the end edge in the ridge line direction where the circumferential velocity becomes faster at the time of cutting processing and the resistance received from the workpiece also tends to become greater, resistance of the rake face of the chisel edge can be kept small, and as a result, influence on the precision of the worked surface can be suppressed.

Moreover, in the above cutting insert, it is preferable that a clearance angle at a distal end part of the arcuate cutting edge is less than 15°.

In this case, since the clearance angle at the distal end part of the arcuate cutting edge is less than 15°, it is possible to ensure a large back metal in the flank face region at the distal end part of the arcuate cutting edge (that is to say, rigidity can be increased), and the cutting edge strength of the distal end part is improved.

In order to make the above action and effect exceptionally excellent, it is preferable that the clearance angle at the distal end part of the arcuate cutting edge is 11° or less.

Moreover, in the above cutting insert, it is preferable that a helical angle at the outermost circumferential point of the arcuate cutting edge is 26° to 32°.

In this case, since the helical angle at the outermost circumferential point of the arcuate cutting edge is 26° to 32°, rigidity of the cutting insert can be ensured while maintaining excellent cutting chip discharge performance and increasing the precision of cutting.

Specifically, since the helical angle at the outermost circumferential point of the arcuate cutting edge is 26° or more, cutting performance in the vicinity of the outermost circumferential point of the arcuate cutting edge is enhanced and cutting chips generated in cutting performed in the vicinity of the outermost circumferential point can be easily discharged toward the proximal end side in the center axis direction. Therefore, excellent cutting chip discharge performance is maintained, and the precision of the worked surface is stably improved.

In addition, since the helical angle at the outermost circumferential point of the arcuate cutting edge is 32° or less, it is possible to keep the thrust force (force toward the proximal end side in the center axis direction) acting on the cutting insert during cutting processing from becoming excessively large, and it is possible to ensure a large back metal of the cutting edge. As a result, chatter vibrations and the like caused by a large thrust force at the time of cutting processing can be effectively suppressed and the precision of the worked surface can be improved, while increasing the rigidity of the cutting insert and preventing chipping or cracking therein.

Moreover, in the above cutting insert, it is preferable that the arcuate cutting edge is of an arc shape protruding in a tool rotation direction about the center axis, and the most protruding point of the arcuate cutting edge that protrudes most in the tool rotation direction is arranged in a range where the radial angle is 30° to 47°.

In this case, since the most protruding point toward the tool rotation direction of the arcuate cutting edge is arranged in a range where the radial angle is 30° to 47°, cutting resistance can be kept small and excellent cutting chip discharge performance can be maintained, thereby improving the precision of the worked surface.

Specifically, in the arcuate cutting edge, since the most protruding point toward the tool rotation direction is arranged in the range where the radial angle is 30° or more, it is possible to prevent the rake angle in the axial direction from becoming excessively large toward the negative angle side in the region from the distalmost end to the most protruding point along the edge length direction of the arcuate cutting edge. As a result, it is possible to keep cutting resistance small in the vicinity of the distal end part of the arcuate cutting edge, and, at the same time, it is possible to suppress clogging of cutting chips and maintain excellent cutting chip discharge performance.

Furthermore, in the arcuate cutting edge, since the most protruding point toward the tool rotation direction is arranged in the range where the radial angle is 47° or less, the region from the distalmost end to the most protruding point along the edge length direction of the arcuate cutting edge, that is, the region where the rake angle in the axial direction is a negative angle, can be kept short, and it is effective for reducing cutting resistance. In addition, the region from the most protruding point to the outermost circumferential point along the edge length direction of the arcuate cutting edge, that is, the region where the axial rake angle is a positive angle, can be ensured long, and it is effective for improving cutting chip discharge performance. That is to say, cutting performance in the region from the most protruding point to the outermost circumferential point of the arcuate cutting edge can be improved, and at the same time, cutting chips generated in the above region can be easily discharged toward the proximal end side in the center axis direction. Therefore, excellent cutting chip discharge performance is maintained, and the precision of the worked surface is stably improved.

Moreover, the above cutting insert is preferably such that: in a virtual plane perpendicular to the reference plane and including the imaginary straight line, a true rake angle, which is an angle at which the rake face of the arcuate cutting edge is inclined with respect to the reference plane, is defined as a radial rake angle; the radial rake angle at a radial angle of 0° is greater than the radial rake angle at a radial angle of 90° and is less than or equal to the radial rake angle at the most protruding point; the maximum value of the radial rake angle is set to a range where the radial angle is 20° to 40°; and the radial rake angle gradually becomes smaller from the most protruding point toward the outermost circumferential point of the arcuate cutting edge.

In the above configuration, when the value of the radial rake angle at the radial angle of 0° is α, the value of the radial rake angle at the radial angle of 90° is β, and the value of the radial rake angle at the most protruding point toward the tool rotation direction of the arcuate cutting edge is γ, the radial rake angle of the arcuate cutting edge satisfies a relationship β<α≤γ. Therefore, it is possible to improve the performance of biting into the workpiece while suppressing chatter vibrations, and to improve the precision of the worked surface while ensuring the strength of the cutting edge.

Specifically, by making the radial rake angle of the arcuate cutting edge satisfy the relation β<α, cutting resistance in the vicinity of the distalmost end of the arcuate cutting edge is reduced to increase the performance of biting into the workpiece. Also, sufficient cutting edge strength can be ensured in the vicinity of the outermost circumferential point of the arcuate cutting edge where the thickness of the cutting chips increases.

Furthermore, by making the radial rake angle of the arcuate cutting edge satisfy the relationship of α≤γ, it is possible to keep cutting resistance small at the most protruding point in the tool rotation direction of the arcuate cutting edge that comes in contact first with the workpiece, and as a result, it is possible to enhance the performance of biting into the workpiece, suppress chatter vibrations, and improve the precision of the worked surface.

Also, since the maximum value of the radial rake angle is set in the range where the radial angle is 20° to 40°, the maximum value of the radial rake angle of the arcuate cutting edge can be easily arranged in the region from the vicinity of the distal end part to the most protruding point along the edge length direction of the arcuate cutting edge.

More specifically, the arcuate cutting edge comes in contact first with the workpiece at the most protruding point in the tool rotation direction. Thereafter the region of contact with the workpiece expands toward the distalmost end side and the outermost circumferential point side along the edge length direction of the arcuate cutting edge. That is to say, on the distalmost end side to the most protruding point along the edge length direction of the arcuate cutting edge, the axial rake angle of the arcuate cutting edge is a negative angle, and on the outermost circumferential point side to the most protruding point, the axial rake angle of the arcuate cutting edge is a positive angle.

Therefore, if the radial rake angle is set to the maximum value in the region from the vicinity of the distal end part to the most protruding point along the edge length direction of the arcuate cutting edge (that is, a cutting edge in which cutting performance is enhanced to the highest level), the cutting resistance is reduced while maintaining the axial rake angle of the region as a negative angle, and excellent cutting performance can be maintained.

In addition, since the radial rake angle is gradually reduced (continuously decreases) from the most protruding point to the outermost circumferential point in the tool rotation direction of the arcuate cutting edge, it is possible to ensure sufficient strength of the cutting edge tip on the outermost circumferential point side where the thickness of the cutting chips tends to be thick in the arcuate cutting edge.

In the above cutting insert, it is preferable that, of both faces facing in the thickness direction of the cutting insert, a face facing the same direction as the rake face is treated as a front face, and a face facing in a direction opposite to the rake face is treated as a back face, and a distance from the outermost circumference point to the back face along the thickness direction is greater than a distance from the outermost circumference point of the arcuate cutting edge along the thickness direction to the front face.

In this case, even in the vicinity of the outermost circumferential point where the back metal tends to be thin on the arcuate cutting edge, it is possible to ensure a sufficient thickness of the back metal and improve the rigidity of the cutting insert. This makes it possible to effectively prevent chipping of the cutting edge in the vicinity of the outermost circumferential point of the arcuate cutting edge or cracking and the like in the cutting insert.

Effect of the Invention

According to the cutting insert and the cutting edge-interchangeable rotary cutting tool of present invention, even when used for high efficiency machining on a high hardness material, it is possible to maintain excellent precision of the worked surface and prevent chipping, thereby prolonging the life of the tool.

EMBODIMENTS FOR CARRYING OUT THE INVENTION

Figure 1:
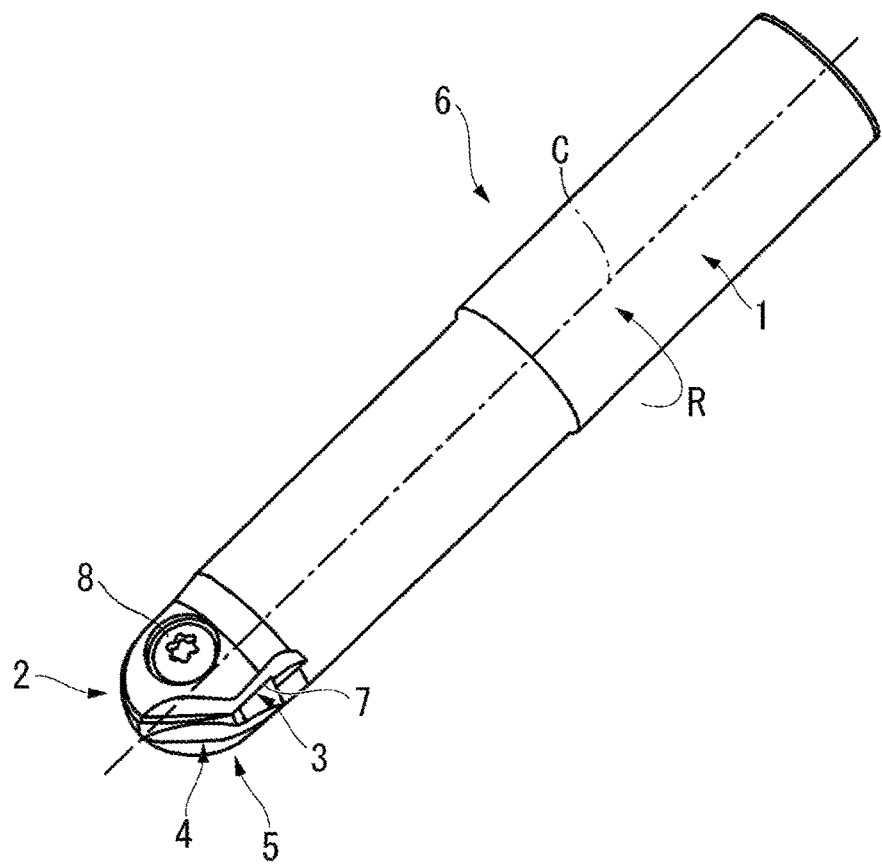
FIG. 1 is a perspective view showing a cutting edge-interchangeable rotary cutting tool according to an embodiment of the present invention.
Figure 2:
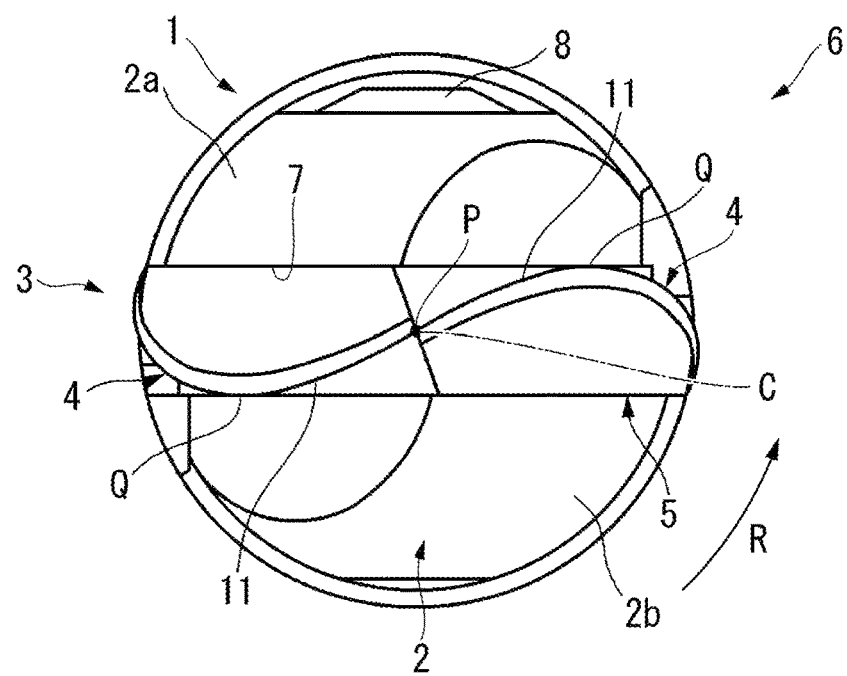
FIG. 2 is a front elevation view of the cutting edge-interchangeable rotary cutting tool.
Figure 3:
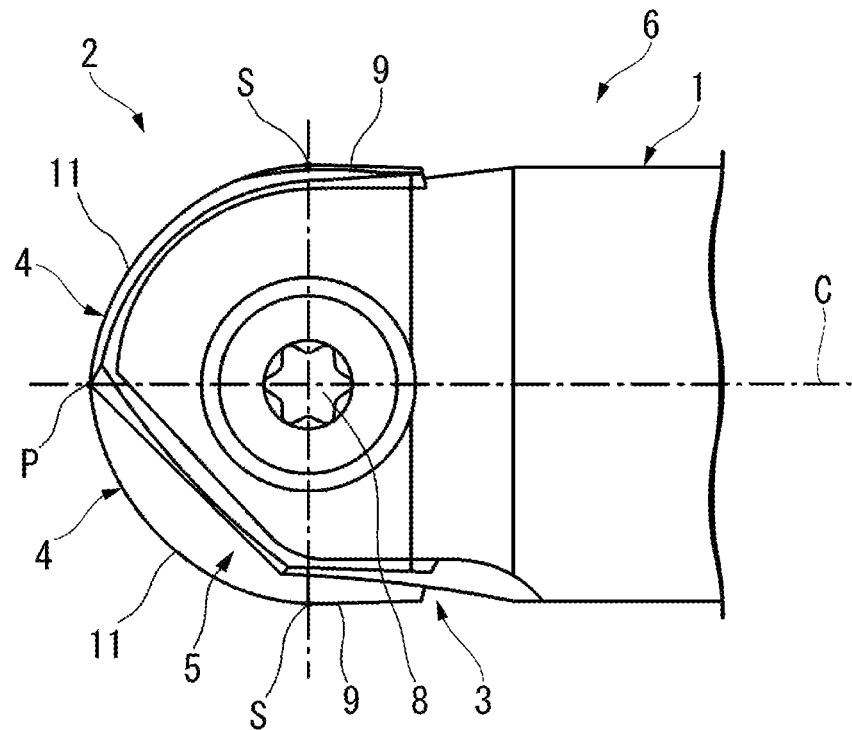
FIG. 3 is a plan of the cutting edge-interchangeable rotary cutting tool.
Figure 4:
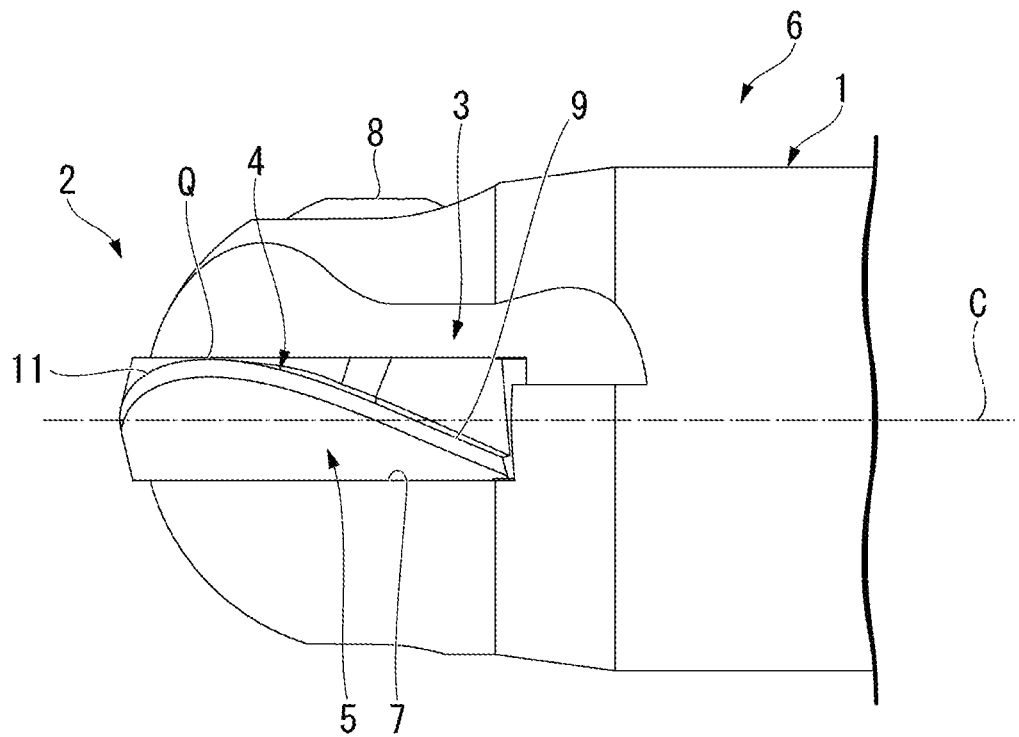
FIG. 4 is a side view of the cutting edge-interchangeable rotary cutting tool.

Hereinafter, a cutting insert 5 and a cutting edge-interchangeable rotary cutting tool furnished with the cutting insert 5 according to an embodiment of the present invention will be described with reference to the drawings. In the present embodiment, the cutting edge-interchangeable rotary cutting tool is a cutting edge-interchangeable ball end mill 6. The cutting edge-interchangeable ball end mill 6 is suitable for performing high efficiency machining such as semi-finishing processing or finishing processing by means of intermittent processing on, for example, a high hardness workpiece such as cast iron that has undergone a quenching treatment.

As shown in FIG. 1 to FIG. 4, the cutting edge-interchangeable ball end mill 6 includes: a substantially column-shaped tool main body 1 that is rotated about a center axis C; a mounting seat 3 formed at a distal end part 2 in a direction of the center axis C of the tool main body 1; and the cutting insert 5 that is detachably attached to the mounting seat 3 and that has cutting edges 4.

The cutting edge-interchangeable ball end mill 6 includes: the tool main body 1 composed of a steel material; and the cutting insert 5 composed of cemented carbide or the like harder than the tool main body 1. The plate-shaped cutting insert 5 is detachably attached, in a state where an insert center axis thereof is coincided with the center axis C of the tool, to the mounting seat (insert mounting seat) 3 formed at the distal end part 2 of the tool main body 1. The cutting edges 4 of the cutting insert 5 attached to the mounting seat 3 are arranged so as to project toward a distal end side and radially outer side of the tool main body 1.

In the cutting edge-interchangeable ball end mill 6, a proximal end (shank part) of the tool main body 1 is attached to a main shaft (not shown in the drawings) of a machine tool, and is rotated in a tool rotation direction R about the center axis C as the main shaft is driven to rotate. With the main shaft, the tool main body 1 is fed in a direction intersecting the center axis C or in the center axis C direction, and thereby the cutting edges 4 of the cutting insert 5 cut into the workpiece composed of a metal material to perform rotation cutting processing (milling processing). Note that the cutting edge-interchangeable ball end mill 6 of the present embodiment may be used for a machine tool in a multi-axis control machining center of 4 to 6 axes, for example.

In the present embodiment, the direction in which the center axis C of the tool main body 1 extends, that is, the direction along the center axis C is referred to as the center axis C direction. In the center axis C direction, a direction from the shank part of the tool main body 1 toward the mounting seat 3 (left side in FIG. 3 and FIG. 4) is referred to as a distal end side, and a direction from the mounting seat 3 toward the shank part (right side in FIG. 3 and FIG. 4) is referred to as a proximal end side.

A direction orthogonal to the center axis C is referred to as a radial direction. In the radial direction, a direction approaching the center axis C is referred to as a radially inner side, and a direction going away from the center axis C is referred to as a radially outer side.

Also, a direction of revolving about the center axis C is referred to as a circumferential direction. In the circumferential direction, an orientation in which the tool main body 1 is rotated by rotation of the main shaft at the time of cutting is referred to as a tool rotation direction R and the rotation direction opposite thereto is referred to as an opposite side to the tool rotation direction R (that is, a counter tool rotation direction).

Note that the above definitions of the orientations (directions) are similarly applied in the cutting insert 5 in which the insert center axis thereof is coincided with (arranged coaxially with) the center axis C of the cutting edge-interchangeable ball end mill 6. Therefore, in FIG. 9 to FIG. 12 showing the cutting insert 5, the insert center axis is denoted using the same sign C as that of the center axis C. Moreover, the insert center axis may be simply referred to as the center axis C in some cases.

As shown in FIG. 1 to FIG. 7, in the distal end part 2 of the tool main body 1, the mounting seat 3 includes: a slit-like insert fitting groove 7 formed so as to include the center axis C of the tool and extend in the radial direction; and a fixing screw 8 for fixing the cutting insert 5 inserted in the insert fitting groove 7.

Figure 5:
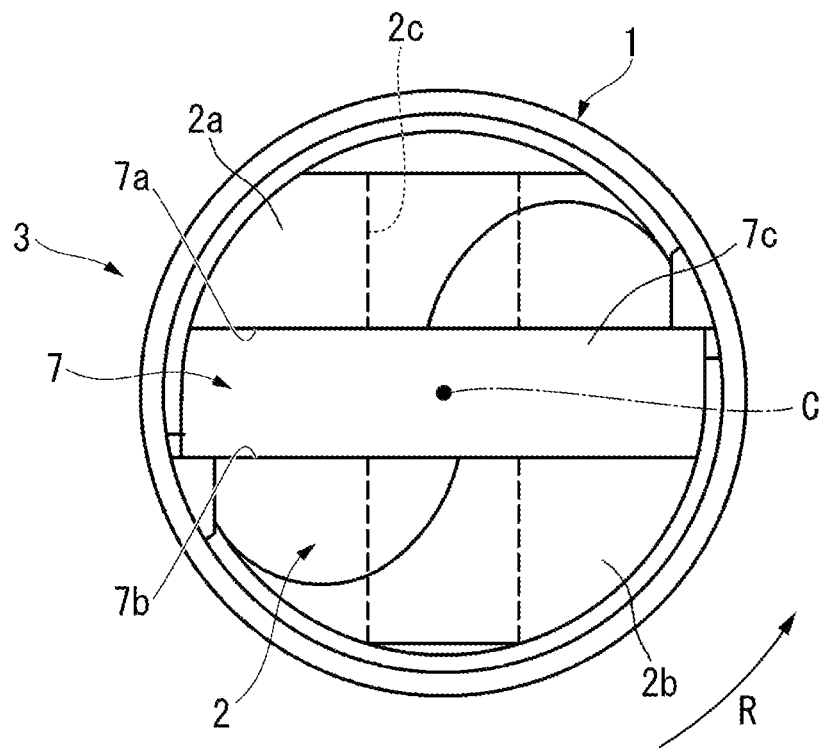
FIG. 5 is a front elevation view showing a tool main body of the cutting edge-interchangeable rotary cutting tool.
Figure 6:
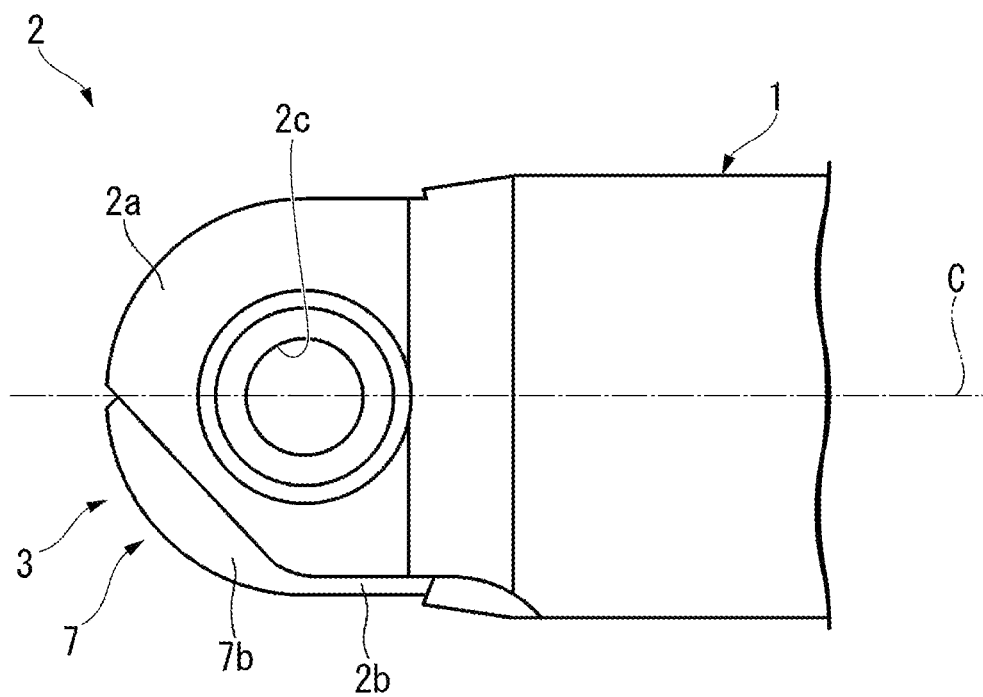
FIG. 6 is a plan view showing the tool main body of the cutting edge-interchangeable rotary cutting tool.
Figure 7:
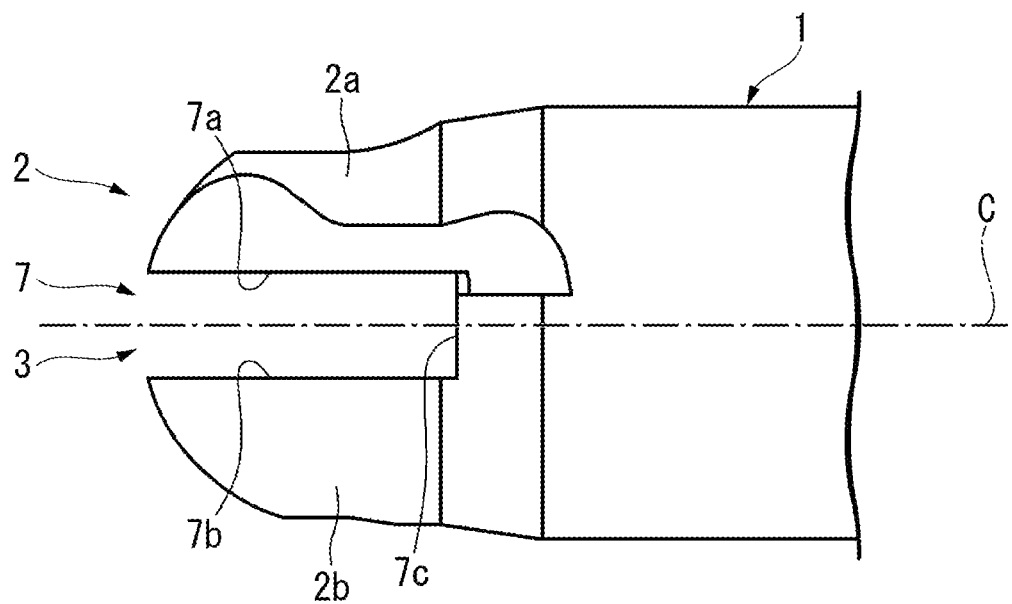
FIG. 7 is a side view showing the tool main body of the cutting edge-interchangeable rotary cutting tool.

In FIG. 5 to FIG. 7, the insert fitting groove 7 opens to a distal end face of the tool main body 1, and also extends in the radial direction of the tool main body 1 and opens to an outer circumferential face of the tool main body 1.

The insert fitting groove 7 has a pair of planar inner walls 7a, 7b arranged in parallel and facing each other with the center axis C being the center therebetween, and a bottom wall 7c that is arranged at an end part on the proximal end side in the insert fitting groove 7 and that connects the inner walls 7a, 7b to each other. The bottom wall 7c faces the distal end side in the center axis C direction, and is of a sectionally recessed V shape recessed toward the proximal end.

The distal end part 2 of the tool main body 1 has, as a result of the slit-like insert fitting groove 7 being formed therein, a pair of distal end half parts 2a, 2b, which are divided into two in the radial direction.

The pair of distal end half parts 2a, 2b each have a substantially semicircular plate shape. Also, distal end portions of the distal end half parts 2a, 2b are each gradually reduced in thickness toward the distal end side.

In the distal end part 2 of the tool main body 1, an insert fixing screw hole 2c is formed so as to extend from an outer face of a distal end half part 2a which is one of the pair of distal end half parts 2a, 2b toward the radially inner side, intersect with the insert fitting groove 7, and reach the interior of the other distal end half part 2b. A screw hole center axis of the insert fixing screw hole 2c extends in a radial direction in the distal end part 2, and specifically, extends in a direction of the radial directions that is orthogonal to the orientation of the insert fitting groove 7 extending in the radial direction.

The inner diameter of a hole portion formed in one distal end half part 2a of the insert fixing screw hole 2c is made larger than the inner diameter of a hole portion formed in the other distal end half part 2b. Moreover, a female screw part to be screwed with a male screw part of the fixing screw 8 is formed on the inner circumferential plane of the hole portion formed in the other distal end half part 2b. In the insert fixing screw hole 2c, at least the hole portion formed in the one distal end half part 2a is a through hole. In the example of the present embodiment, each of the hole portions of the one distal end half part 2a and the other distal end half part 2b is a through hole.

As shown in FIG. 8 to FIG. 11, the cutting insert 5 includes: a plate-shaped insert main body 15; cutting edges 4 formed on an intersecting ridge line between rake faces and flank faces formed in the insert main body 15; and a screw insertion hole 18 formed in the insert main body 15 and passing through the insert main body 15 in a thickness direction. The thickness direction is perpendicular to the insert center axis C, and the center axis of the screw insertion hole 18 is orthogonal to the insert center axis C.

The cutting insert 5 of the present embodiment is of a shape having front-back inversion symmetry (a 180° rotationally symmetric shape) about the center axis C being the center (symmetrical axis) thereof, and includes a pair of cutting edges 4 (two cutting edges). In other words, the cutting insert 5 is a two-blade cutting insert.

The insert main body 15 is of a substantially flat plate shape. On both faces (front face and rear face) facing in the thickness direction of the insert main body 15 there are formed a pair of planar parts 16, 17 each forming a plane perpendicular to the thickness direction. Moreover, on the face of the insert main body 15 facing the proximal end side in the center axis C direction, there is formed a top face 19 having a sectionally recessed V shape protruding toward the proximal end side.

When this cutting insert 5 is inserted into the insert fitting groove 7 of the mounting seat 3, the pair of planar parts 16, 17 come in contact with the inner walls 7a, 7b of the insert fitting groove 7. Also, the top face 19 comes in contact with the bottom wall 7c of the insert fitting groove 7. As a result, the movement of the cutting insert 5 in the radial direction and the circumferential direction with respect to the insert fitting groove 7 is restricted.

The screw insertion hole 18 is a through hole that passes through the insert main body 15 in the thickness direction and is formed to open to one planar part 16 and the other planar part 17. When attaching and fixing the cutting insert 5 onto the mounting seat 3, the fixing screw 8 is inserted into the screw insertion hole 18.

Specifically, in a state where the cutting insert 5 is inserted into the insert fitting groove 7 of the mounting seat 3, by inserting the fixing screw 8 from the hole portion of the insert fixing screw hole 2c of the one distal end half part 2a, inserting the fixing screw 8 into the screw insertion hole 18 of the cutting insert 5, and screwing it into the hole portion of the insert fixing screw hole 2c of the other distal end half part 2b, the cutting insert 5 is fixed to the mounting seat 3. Moreover, detachment of the cutting insert 5 from the insert fitting groove 7 is restricted.

Each cutting edge 4 is formed over a range from the distal end part in the center axis C direction of the insert main body 15 to the end part on the radially outer side.

Each of the pair of cutting edges 4 includes: an arcuate cutting edge (bottom cutting edge) 11 having an arc shape protruding toward the distal end side and the outer circumferential side of the insert main body 15 (cutting insert 5); and an outer circumferential cutting edge 9 that connects to an outermost circumferential point S, which is a radially outer side end edge of the arcuate cutting edge 11 and is also a proximal end side end edge in the center axis C direction, and that extends from the outermost circumferential point S toward the proximal end side in the center axis C direction.

The arcuate cutting edge 11 and the outer circumferential cutting edge 9 are in contact with each other at the outermost circumferential point S, that is to say, they are gently connected so as to have a common tangent line at a mutually connecting portion.

Moreover, the pair of arcuate cutting edges 11 are formed so as to be 180° rotationally symmetric about the center axis C, and the pair of outer circumferential cutting edges 9 are formed so as to be 180° rotationally symmetric about the center axis C.

Figure 10:
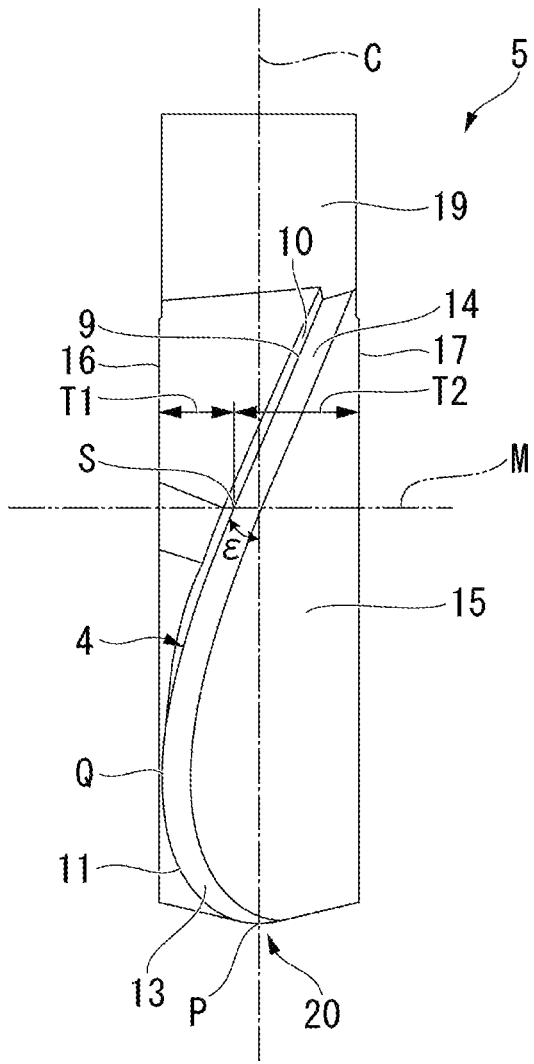
FIG. 10 is a side view showing the cutting insert.
Figure 11:
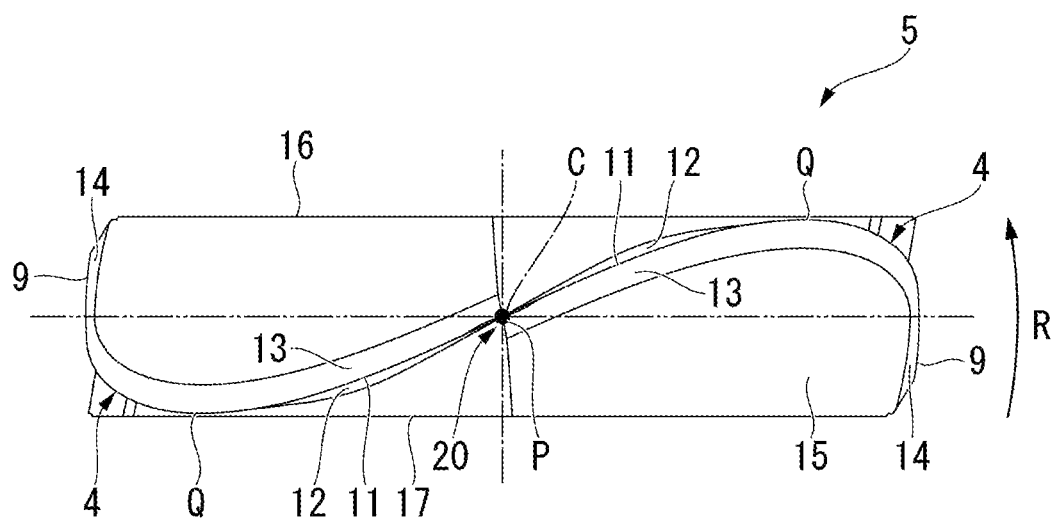
FIG. 11 is a front elevation view showing the cutting insert.

As shown in FIG. 10 and FIG. 11, each arcuate cutting edge 11 is of an arc shape protruding in the tool rotation direction R about the center axis C. In the arcuate cutting edge 11, a point of protruding most in the tool rotation direction R is referred to as the most protruding point Q in this embodiment.

The most protruding point Q oriented in the tool rotation direction R of the arcuate cutting edge 11 is arranged in a range where the radial angle θ is 30° to 47°.

Figure 9:
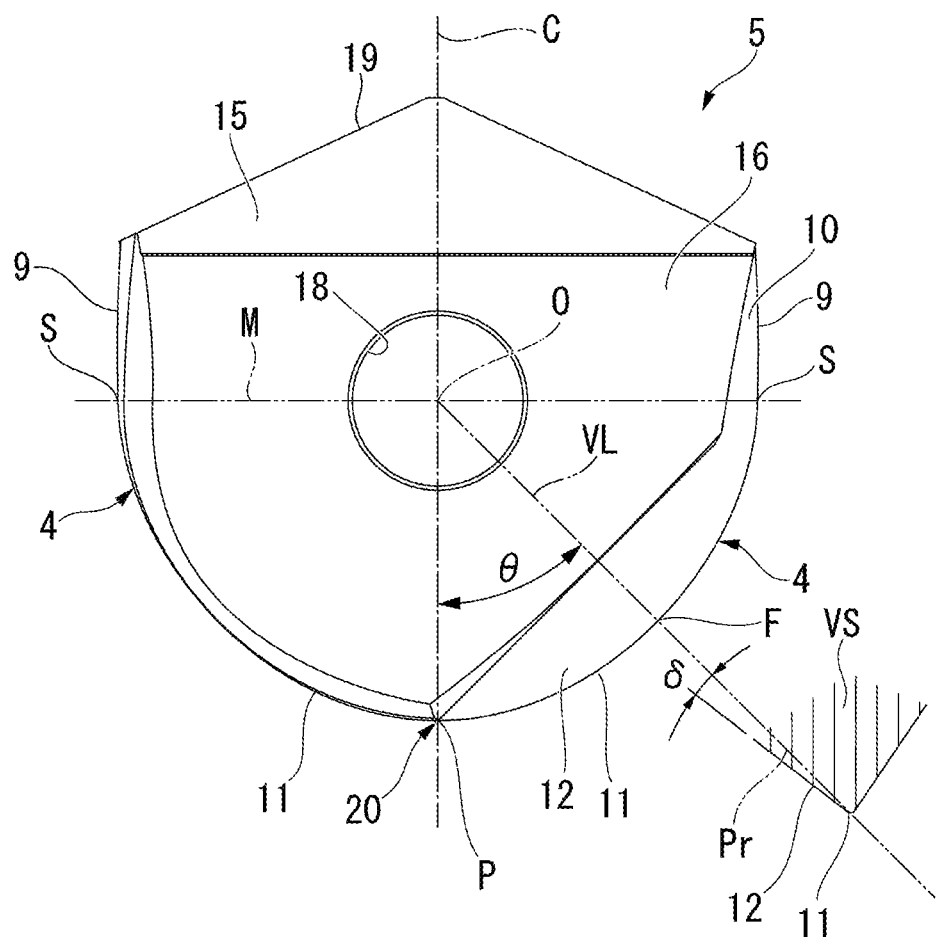
FIG. 9 is a plan view showing the cutting insert, and also a diagram for describing a radial angle and a radial rake angle.

In FIG. 9, the above "radial angle θ" is an angle θ at which an imaginary straight line VL is inclined with respect to the center axis C in a reference plane Pr when projecting the imaginary straight line VL passing through an arc center point O of the arcuate cutting edge 11 and a predetermined point F, on the reference plane Pr that includes the predetermined point F on the arcuate cutting edge 11 and the center axis C. Note that the "reference plane Pr" is an imaginary plane perpendicular to the tool main movement direction of the cutting edge-interchangeable ball end mill 6 (tool rotation direction R), and the plane includes the center axis C and the predetermined point F on the arcuate cutting edge 11. Moreover, "projecting the imaginary straight line VL on the reference plane Pr" means projecting the imaginary straight line VL on the reference plane Pr perpendicularly. Furthermore, among an acute angle and an obtuse angle formed by the intersecting imaginary straight line VL and the center axis C in the reference plane Pr, "the angle at which the imaginary straight line VL is inclined with respect to the center axis C in the reference plane Pr" refers to the acute angle. Moreover, "the arc center point O of the arcuate cutting edge 11" is positioned on the center axis C in the plan view (FIG. 9) of the cutting insert 5 as seen from the thickness direction. Also, in the side view (FIG. 10) of the cutting insert seen from a direction orthogonal to the thickness direction and the center axis C, the arc center point O is positioned on the center axis C serving as a position in the thickness direction.

As shown in FIG. 11, in the insert front view of the cutting insert 5 as seen from the distal end toward the proximal end side in the center axis C direction, the pair of arcuate cutting edges 11 having the most protruding point Q is, as a whole, of a substantially S shape with the center axis C serving as the center thereof.

A rotation locus obtained by rotating these arcuate cutting edges 11 about the center axis C is of a hemispherical shape that has a center thereof on the center axis C and that protrudes toward the distal end side.

In the arcuate cutting edge 11, the amount of displacement in the center axis C direction per unit length along the radial direction (that is, the inclination with respect to the imaginary plane perpendicular to the center axis C) gradually becomes smaller from the radially outer end (the outermost circumferential point S) of the arcuate cutting edge 11 toward the radially inner side, and becomes zero at the radially inner end. In other words, the tangent line at the radially inner end of the arcuate cutting edge 11 is parallel to the imaginary plane perpendicular to the center axis C.

The radially inner end of the arcuate cutting edge 11 is also a distal end side end edge in the center axis C direction of the arcuate cutting edge 11. In the present embodiment, the distal end side end edge of the arcuate cutting edge 11 is referred to as a distalmost end P.

In the rake face facing in the tool rotation direction R of the cutting edge 4, in a portion adjacent to the arcuate cutting edge 11 (a portion adjacent to the proximal end inner circumferential side of the arcuate cutting edge 11) there is formed a rake face 12 of the arcuate cutting edge 11. In the example of the present embodiment, the rake face 12 of the arcuate cutting edge 11 is of a curved surface protruding in the tool rotation direction R.

As shown in FIG. 9, in a virtual plane VS perpendicular to the reference plane Pr and including the imaginary straight line VL, a true rake angle, which is an angle at which the rake face 12 of the arcuate cutting edge 11 is inclined with respect to the reference plane Pr, is defined as a radial rake angle δ.

Figure 15:
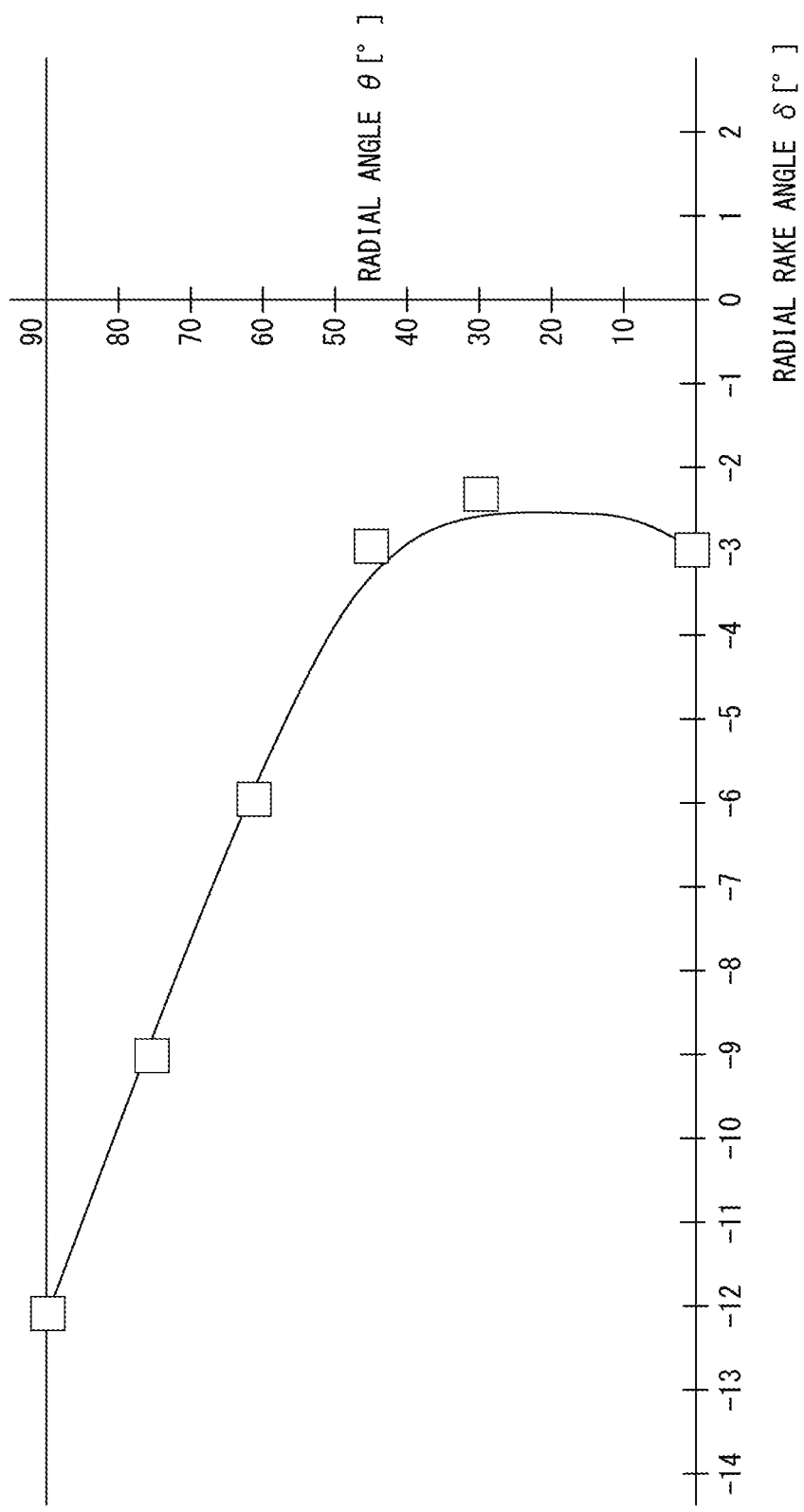
FIG. 15 is a graph showing a profile of the radial rake angles in an arcuate cutting edge of the cutting insert.

As shown in FIG. 15, in the example of the present embodiment, the radial rake angle δ is a negative angle over the entire region in the edge length direction of the arcuate cutting edge 11 (the extending direction of the arcuate cutting edge 11). That is to say, the radial rake angle δ is a negative angle in a range where the radial angle θ is 0° to 90. In FIG. 15, the measured values of the radial rake angle δ of the cutting insert according to an example of the present embodiment are plotted, and a profile obtained by connecting the plots with a curved line is shown.

Moreover, the radial rake angle δ at the radial angle θ of 0° is greater than the radial rake angle δ at the radial angle θ of 90° and is less than or equal to the radial rake angle δ at the most protruding point Q. That is to say, when the value of the radial rake angle δ at the radial angle θ of 0° is α, the value of the radial rake angle δ at the radial angle θ of 90° is β, and the value of the radial rake angle δ at the most protruding point toward the tool rotation direction of the arcuate cutting edge 11 is γ, the radial rake angle δ of the arcuate cutting edge 11 satisfies a relationship β<α≤γ.

The maximum value of the radial rake angle δ is set to a range where the radial angle θ is 20° to 40°. The maximum value of the radial rake angle δ is arranged in the region from the vicinity of the distal end part to the most protruding point Q along the edge length direction of the arcuate cutting edge 11.

Moreover, the radial rake angle δ gradually becomes smaller from the most protruding point Q toward the outermost circumferential point S of the arcuate cutting edge 11.

In FIG. 9, in the example of the present embodiment, the arc center point O of the arcuate cutting edge 11 is positioned on the center axis of the screw insertion hole 18. In FIG. 9 and FIG. 10, reference symbol M denotes an imaginary plane perpendicular to the center axis C of the cutting insert and including the arc center point O. In the example of the present embodiment, the outermost circumferential point S of the arcuate cutting edge 11 is positioned on the imaginary plane M.

In FIG. 10, the helical angle ε at the outermost circumferential point S of the arcuate cutting edge 11 is a positive angle, specifically 26° to 32°. The helical angle ε corresponds to the axial rake angle at the outermost circumferential point S of the arcuate cutting edge 11.

In the side view of the cutting insert 5 shown in FIG. 10, of both faces facing in the thickness direction of the cutting insert 5 (insert main body 15), a face facing the same direction as the rake face of the cutting edge 4 (the face in which the planar part 16 is arranged) is treated as a front face, and a face facing in a direction opposite to the rake face (the face in which the planar part 17 is arranged) is treated as a back face. In the example of the present embodiment, a distance T2 from the outermost circumferential point S to the back face (the planar part 17) along the thickness direction is greater than a distance T1 from the outermost circumferential point S of the arcuate cutting edge 11 to the front face (planar part 16) along the thickness direction of the cutting insert 5.

In FIG. 9, a round honing is formed on the cutting edge tip of the arcuate cutting edge 11 at least in a range where the radial angle θ is 30° or less. In the example of the present embodiment, the round honing is formed over the entire region in the edge length direction of the arcuate cutting edge 11 (that is, in a range where the radial angle θ is 90° or less).

A curvature radius of the round honing in a cross section perpendicular to the edge length direction of the arcuate cutting edge 11 (in a cross section perpendicular to the cutting edge 4) is 20 to 40 μm. Also, the curvature radius of the round honing gradually decreases from the distalmost end P toward the outermost circumferential point S side along the edge length direction of the arcuate cutting edge 11. To give an example of the present embodiment, the curvature radius of the round honing is: 32 μm in the vicinity of the distalmost end along the edge length direction of the arcuate cutting edge 11 (the radial angle θ is around 0°); 21 μm at the radial angle θ around 45°; and 16 μm in the vicinity of the outermost circumferential point S along the edge length direction of the arcuate cutting edge 11 (the radial angle θ is around 90°). In other words, the curvature radius of the round honing in the vicinity of the distalmost end P of the arcuate cutting edge 11 is twice or more the curvature radius of the round honing in the vicinity of the outermost circumferential point S of the arcuate cutting edge 11.

In order to apply such round honing to the cutting edge tip of the arcuate cutting edge 11 when manufacturing the cutting insert 5, a cutting edge tip treatment may be performed using a dedicated brush or the like in which, for example, diamond abrasive grains are dispersed in a brush part thereof, so that the arcuate cutting edge 11 and the dedicated brush are subjected to a relative three-dimensional movement. As an example, in the state where the dedicated brush having a substantially cylindrical shape is rotating about the rotation axis, the arcuate cutting edge 11 is made to pass through inside the brush in a direction parallel to the brush rotation axis while changing the relative velocity thereof, and the intersecting angle and the intersecting speed at this time between the arcuate cutting edge 11 and the brush are optimized. Thereby, variation can be introduced to the finished result of the round honing.

Figure 8:
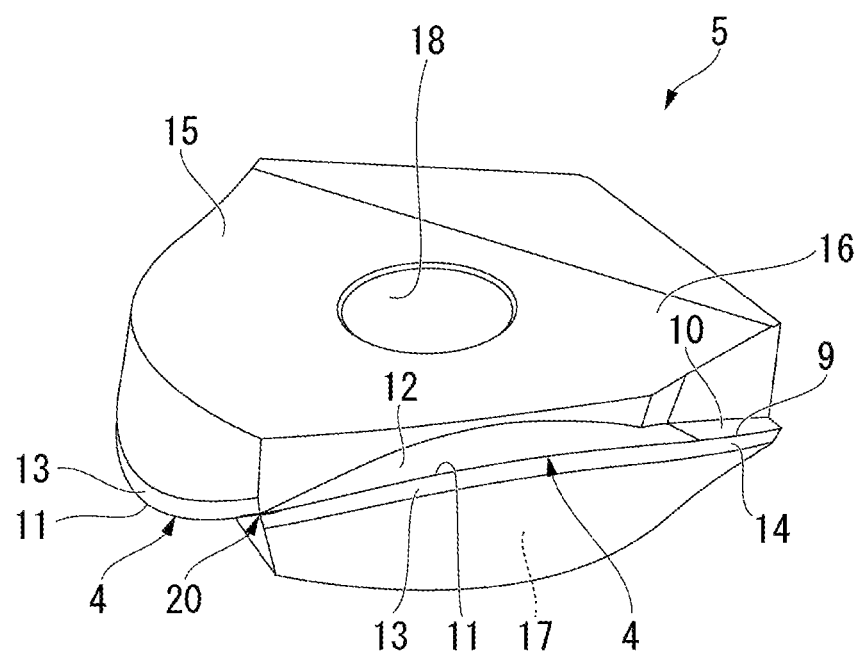
FIG. 8 is a perspective view showing a cutting insert.

As shown in FIG. 8, FIG. 10, and FIG. 11, in the outer circumferential face of the insert main body 15, in the portion adjacent to the arcuate cutting edge 11 (the portion adjacent to the arcuate cutting edge 11 on the opposite side to the tool rotation direction R), there is formed a flank face 13 of the arcuate cutting edge 11. The flank face 13 of the arcuate cutting edge 11 inclines so as to retreat from the imaginary hemispherical surface formed by the rotation locus about the center axis C of the arcuate cutting edge 11 toward the radially inner side, with approach from the arcuate cutting edge 11 toward the opposite side to the tool rotation direction R, and this gives the arcuate cutting edge 11 a clearance angle.

In the example of the present embodiment, the clearance angle at the distal end part of the arcuate cutting edge 11 is less than 15°. It is preferable that the clearance angle at the distal end part of the arcuate cutting edge 11 is 11° or less.

Figure 12:
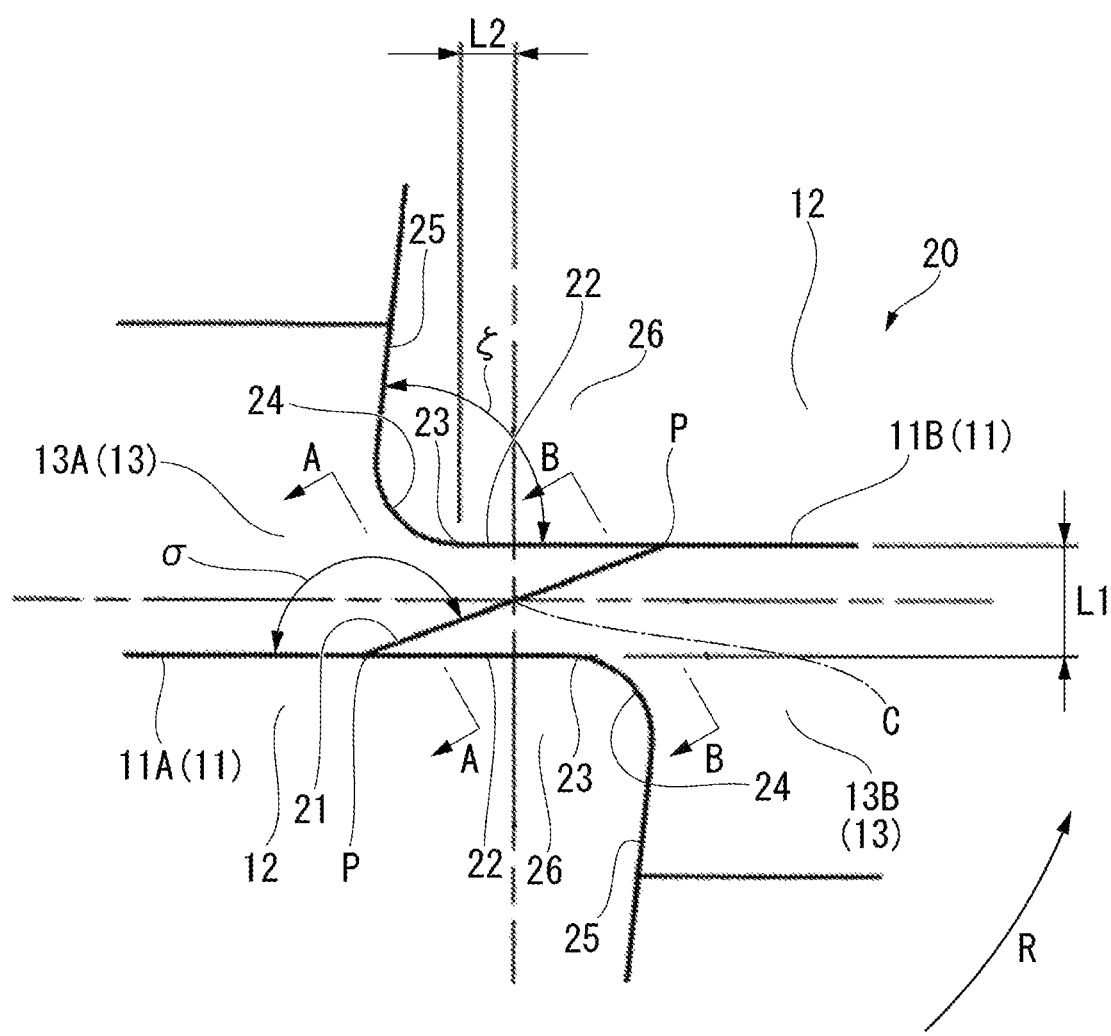
FIG. 12 is an enlarged view showing a chisel part of FIG. 11.

In FIG. 11 and FIG. 12, a chisel part 20 is formed at an intersecting ridge line part between the flank faces 13 of the pair of arcuate cutting edges 11. The chisel part 20 is arranged at the distal end part of the cutting insert 5 (the insert main body 15), and is positioned on the center axis C. The chisel part 20 has a chisel edge 21 formed at an intersecting ridge line part between the flank faces 13 of the pair of arcuate cutting edges 11. That is to say, in the chisel part 20, the two flank faces 13 are continuous via the chisel edge 21. The chisel edge 21 extends in a radial direction perpendicular to the center axis C.

As shown in FIG. 12, a chisel angle σ formed between the distal end part (the vicinity of the distalmost end P) of the arcuate cutting edge 11 and the chisel edge 21 of the chisel part 20 is 150° to 170° as seen in the insert front view of the cutting insert 5 viewed from the distal end toward the proximal end side in the center axis C direction.

Among an acute angle and an obtuse angle formed by the arcuate cutting edge 11 and the chisel edge 21 intersecting with each other as seen in the insert front view, the chisel angle σ means an angle of the obtuse angle.

The tool cutting edge diameter D (mm) of the cutting insert 5 is 6 to 50 mm, and as seen in the insert front view shown in FIG. 12, a chisel thickness L1 (mm) along a width direction (the vertical direction in FIG. 12) of the chisel part 20 perpendicular to the edge length direction (the lateral direction in FIG. 12) of the distal end part of the arcuate cutting edge 11 satisfies $0.007 \times D \leq L1 \leq 0.024 \times D$. The tool cutting edge diameter D (mm) of the cutting insert 5 is the diameter of a circle the radius of which is the distance between the outermost circumferential point S of the arcuate cutting edge 11 and the center axis C, and has a length twice the distance between the outermost circumferential point S of the arcuate cutting edge 11 and the center axis C.

Also, in this insert front view, on the chisel part 20, there is formed a linear ridge line part 22 extending on the extension line of the arcuate cutting edge 11 along the edge length direction of the distal end part of the arcuate cutting edge 11, and a chisel intersection amount L2, which is a distance along the edge length direction from an end edge 23 on the side opposite to the distalmost end P of the arcuate cutting edge 11 at the ridge line part 22 to the center axis C, is 0.10 to 0.20 mm.

The ridge line part 22 is formed in a pair at both ends in the width direction of the chisel part 20 and is arranged so as to retreat to the proximal end side in the center axis C direction from the distalmost end P of the arcuate cutting edge 11. Also, to the end edge 23 of the ridge line part 22 there is connected a chisel R part 24 having a recessed curved line shape. The ridge line part 22 and the chisel R part 24 are gently connected so as to be in contact with each other at the end edge 23.

Moreover, as shown in FIG. 12, in the insert front view of the cutting insert 5 as viewed from the distal end toward the proximal end side in the center axis C direction, of the both end edges in the extending direction of the chisel R part 24, a ridge line part 25 is connected to the end edge positioned on the opposite side to the end edge 23 of the ridge line part 22. The ridge line part 25 is of a straight line shape and gently connects to the chisel R part 24 so as to have a tangent line in common with the chisel R part 24 at the end edge connected to the chisel R part 24.

A recess part 26 surrounded by the ridge line parts 22, 25 and the chisel R part 24 functions as a cutting chip discharge pocket for temporarily holding cutting chips. In the example of the present embodiment, in the insert front view, an angle ζ formed between the ridge line part 22 and the ridge line part 25 forms an acute angle.

The distalmost ends P of the pair of the arcuate cutting edges 11 are connected to both ends of the chisel edge 21 in the ridge line direction (in the direction in which the ridge line of the chisel edge 21 extends).

Figure 13:
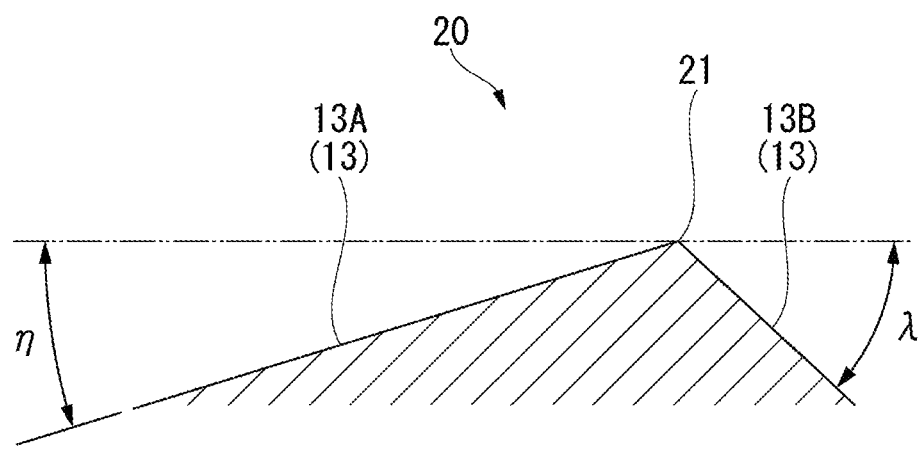
FIG. 13 is a diagram showing a cross section taken along the line A-A of FIG. 12.
Figure 14:
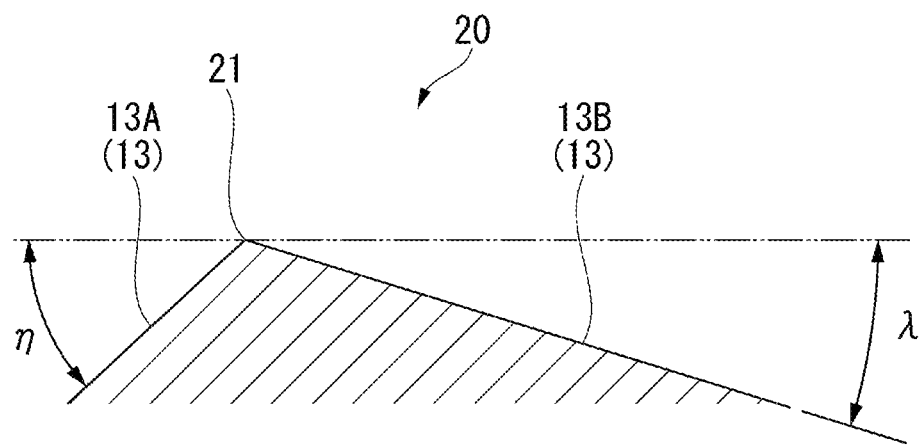
FIG. 14 is a diagram showing a cross section taken along the line B-B of FIG. 12.

As shown in FIG. 12 to FIG. 14, the clearance angle η of the chisel edge 21 gradually becomes greater from one arcuate cutting edge 11A (11) of the pair of arcuate cutting edges 11 having a flank face 13A (13) in common with the flank face 13A (13) of the chisel edge 21, toward the other arcuate cutting edge 11B (11) side along the ridge line direction of the chisel edge 21. The clearance angle η is an angle formed by the flank 13A of the chisel edge 21 with respect to a plane orthogonal to the center axis C.

Moreover, the cutting insert 5 is formed front-back inversion symmetric (180° rotationally symmetric) about the center axis C. Therefore, the clearance angle λ of the chisel edge 21 gradually becomes greater from the other arcuate cutting edge 11B (11) of the pair of arcuate cutting edges 11 having a flank face 13B (13) in common with the flank face 13B (13) of the chisel edge 21, toward the other arcuate cutting edge 11A (11) side along the ridge line direction of the chisel edge 21. The clearance angle λ is an angle formed by the flank 13B of the chisel edge 21 with respect to the plane orthogonal to the center axis C.

Specifically, since the chisel edge 21 is formed on the intersecting ridge line between the flank surfaces 13A, 13B of the pair of arcuate cutting edge 11A, 11B, the clearance angles η, λ of the chisel edge 21 are set on both sides of the ridge line of the chisel edge 21.

In FIG. 13 and FIG. 14, the clearance angle denoted by reference symbol η represents the clearance angle η of the chisel edge 21 on the basis of the flank surface 13A positioned on the upper left side of the chisel edge 21 of FIG.

12, and the clearance angle denoted by reference symbol λ represents the clearance angle λ, of the chisel edge 21 on the basis of the flank surface 13B positioned on the lower right side of the chisel edge 21 of FIG. 12.

In other words, it can be said that the present embodiment has the following configuration.

That is to say, the rake angle of the chisel edge 21 (the rake angle in the case where the flank face 13B on the right side of the chisel edge 21 in FIG. 13 FIG. 14 is treated as a rake angle) gradually becomes smaller from the one arcuate cutting edge 11A (11) of the pair of arcuate cutting edges 11 having the flank face 13A (13) in common with the flank face 13A (13) of the chisel edge 21, toward the other arcuate cutting edge 11B (11) side along the ridge line direction of the chisel edge 21.

Also, the rake angle of the chisel edge 21 (the rake angle in the case where the flank face 13A on the left side of the chisel edge 21 in FIG. 13 FIG. 14 is treated as a rake angle) gradually becomes smaller from the other arcuate cutting edge 11B (11) of the pair of arcuate cutting edges 11 having the flank face 13B (13) in common with the flank face 13B (13) of the chisel edge 21, toward the one arcuate cutting edge 11A (11) side along the ridge line direction of the chisel edge 21.

As shown in FIG. 8 to FIG. 11, the outer circumferential cutting edge 9 is arranged at the proximal end part in the center axis C direction of the cutting edge 4 and extends in the center axis C direction. Specifically, the outer circumferential cutting edge 9 is twisted and extends toward the side opposite to the tool rotation direction R from the distal end connected to the outermost circumferential point S of the arcuate cutting edge 11 toward the proximal end side in the center axis C direction.

As shown in FIG. 10, the helical angle of the outer circumferential cutting edge 9 is substantially the same as the helical angle ε at the outermost circumferential point S of the arcuate cutting edge 11.

In the example of the present embodiment, the outer circumferential cutting edge 9 is positioned on the radially outermost side on the cutting edge 4, along with the outermost circumferential point S of the arcuate cutting edge 11. A rotation locus obtained by rotating this outer circumferential cutting edge 9 about the center axis C is of a cylindrical plane shape having a center thereof on the center axis C.

In the rake face facing in the tool rotation direction R of the cutting edge 4, in a portion adjacent to the outer circumferential cutting edge 9 (a portion adjacent to the radially inner side of the outer circumferential cutting edge 9) there is formed a rake face 10 of the outer circumferential cutting edge 9. In the example of the present embodiment, the rake face 10 of the outer circumferential cutting edge 9 is of a plane shape. Moreover, the radial rake angle of the outer circumferential cutting edge 9 is a negative angle over the entire region in the edge length direction of the outer circumferential cutting edge 9.

In the example of the present embodiment, a round honing is also formed on the cutting edge tip of the outer circumferential cutting edge 9 as with the arcuate cutting edge 11. However, the round honing need not be formed on the outer circumferential cutting edge 9.

As shown in FIG. 8, FIG. 10, and FIG. 11, in the outer circumferential face of the insert main body 15, in the portion adjacent to the outer circumferential cutting edge 9 (the portion adjacent to the outer circumferential cutting edge 9 on the opposite side to the tool rotation direction R), there is formed a flank face 14 of the outer circumferential cutting edge 9. The flank face 14 of the outer circumferential cutting edge 9 inclines so as to retreat from the imaginary cylindrical surface formed by the rotation locus about the center axis C of the outer circumferential cutting edge 9 toward the radially inner side, with approach from the outer circumferential cutting edge 9 toward the side opposite to the tool rotation direction R, and this gives the outer circumferential cutting edge 9 a clearance angle.

In the example of the present embodiment, the length of the flank face 14 of the outer circumferential cutting edge 9 extending from the outer circumferential cutting edge 9 toward the side opposite to the tool rotation direction R (that is, the width of the flank face 14) is substantially the same as the flank face 13 of the arcuate cutting edge 11 extending from the arcuate cutting edge 11 toward the side opposite to the tool rotation direction R (that is, the width of the flank face 13). That is to say, the width of the flank face is constant over the entire region in the edge length direction of the cutting edge 4.

In the cutting insert 5 and the cutting edge-interchangeable ball end mill 6 of the present exemplary embodiment described above, a round honing is formed on the arcuate cutting edge 11 at least in a range where the radial angle θ is 30° or less. More specifically, the round honing is formed in the arcuate cutting edge 11, particularly in a region from the vicinity of the distalmost end P in the center axis C direction (radial angle θ is around 0°) where chipping can occur easily in the cutting edge tip at time of high efficiency machining or the like on a high hardness material, to the area where the radial angle θ is 30° (hereinafter, referred to as the vicinity of the distal end part of the arcuate cutting edge 11). The curvature radius of the round honing in the cross section perpendicular to the edge length direction of the arcuate cutting edge 11 (in the cross section perpendicular to the cutting edge 4) is 20 to 40 μm. As a result, it is possible to prevent chipping to the arcuate cutting edge 11 and the chisel part 20 that continues to the distal end side therefrom while sufficiently increasing the precision of a worked surface of a workpiece.

Specifically, since the curvature radius of the round honing of the arcuate cutting edge 11 is 20 μm or more, even in the case of, for example, performing high efficiency machining including semi-finishing processing or the like by means of intermittent processing on a high hardness workpiece such as cast iron that has been subjected to a quenching treatment, the strength of the cutting edge in the vicinity of the distal end part of the arcuate cutting edge 11 is sufficiently ensured and chipping is prevented. In other words, by appropriately rounding the cutting edge tip of the arcuate cutting edge 11, chipping or the like in the cutting edge tip due to shocks or excessive biting at the time of coming into contact with the workpiece is suppressed.

On the other hand, when the curvature radius of the round honing of the arcuate cutting edge 11 is less than 20 μm, the cutting edge tip strength in the vicinity of the distal end part of the arcuate cutting edge 11 cannot be ensured and chipping can easily occur during the high efficiency processing as described above.

In addition, since the curvature radius of the round honing of the arcuate cutting edge 11 is 40 μm or less, cutting performance of the cutting edge tip of the arcuate cutting edge 11 can be ensured, and even during high efficiency processing as described above, excellent surface quality of the worked surface of the workpiece is maintained.

On the other hand, when the curvature radius of the round honing of the arcuate cutting edge 11 exceeds 40 μm, cutting performance of the arcuate cutting edge 11 is reduced, which affects the surface quality of the worked surface of the workpiece.

The curvature radius of the round honing of the arcuate cutting edge 11 is preferably 20 to 35 more preferably 20 to 32 μm, but is not limited thereto.

Also, as shown in FIG. 12, a chisel angle σ formed between the distal end part of the arcuate cutting edge 11 and the chisel edge 21 of the chisel part 20 is 150° to 170° as seen in the insert front view of the cutting insert 5 viewed from the distal end toward the proximal end side in the center axis C direction. As a result, it is possible to prevent chipping in the vicinity of the chisel part 20 while increasing the precision of a worked surface of a workpiece.

Specifically, since the chisel angle σ is 150° or more, it is possible to keep the inclination of the chisel edge 21 with respect to the distal end part of the arcuate cutting edge 11 from becoming excessively steep, and to prevent formation of a portion that bends precipitously (bent portion) in a connecting portion between the arcuate cutting edge 11 and the chisel edge 21 (that is, the distalmost end P), thereby preventing chipping caused by concentrated stress in this bent portion. Moreover, when the chisel angle σ is 150° or more, it is easy to ensure the length of the chisel part 20 (the length along the edge length direction of the distal end part of the arcuate cutting edge 11). Therefore it becomes easier to ensure the capacity of a recess part (a pocket adjacent to the chisel part 20) for temporarily holding cutting chips discharged from the distal end part of the arcuate cutting edge 11. As a result, even at the time of high efficiency machining as described above, excellent performance of discharging cutting chips generated from the distal end part and the like of the arcuate cutting edge 11 is maintained, and chipping in the vicinity of the chisel part 20 due to chip clogging is prevented.

On the other hand, when the chisel angle σ is less than 150°, the bent portion tends to be formed and chipping caused by the bent portion is likely to occur. Also, the length of the chisel part 20 is reduced, and cutting chips generated from the distal end part and the like of the arcuate cutting edge 11 cannot be stably discharged, so that chipping is likely to occur in the vicinity of the chisel part 20.

Moreover, since the chisel angle σ is 170° or less, it is possible to keep the inclination of the chisel edge 21 with respect to the distal end part of the arcuate cutting edge 11 from becoming excessively gradual, and thereby reduce the length of the chisel edge 21 (the length in the ridge line direction of the chisel edge 21). When the length of the chisel edge 21 is kept short, the rotation locus about the center axis C of the arcuate cutting edge 11 can be brought closer to the desired hemispherical surface (in particular, it becomes easier to coincide the rotation locus in the vicinity of the distalmost end P of the arcuate cutting edge 11 with the hemispherical surface), and it is possible to keep the R precision of the arcuate cutting edge 11 (the amount of actual deviation in which the arcuate cutting edge 11 is protruded or recessed in the radial direction with respect to the desired hemispherical surface) within a range of ±5 μm. The radial direction is a direction from the center of the above desired hemispherical surface to an arbitrary point on the hemispherical surface.

On the other hand, when the chisel angle n exceeds 170°, the inclination of the chisel edge 21 with respect to the distal end part of the arcuate cutting edge 11 becomes excessively gradual, and the length of the chisel edge 21 becomes long, making it impossible to maintain excellent R precision of the arcuate cutting edge 11. Therefore, the precision of the worked surface of the workpiece is influenced.

The chisel angle n is preferably 152° to 167°, and more preferably 154° to 163°, but is not limited thereto.

As described above, according to the present embodiment, even when used for high efficiency machining on a high hardness material, it is possible to maintain excellent precision of the worked surface and prevent chipping, thereby prolonging the life of the tool.

Also, in the present embodiment, the curvature radius of the round honing of the arcuate cutting edge 11 gradually decreases from the distalmost end P toward the outermost circumferential point S side along the edge length direction of the arcuate cutting edge 11. Therefore the following action and effect can be achieved.

That is to say, as a result of earnest research by the inventors of the present invention, it has been found that, when using the cutting insert 5 for high efficiency machining, it is the most difficult to ensure the cutting edge tip strength in the vicinity of the distal end part of the arcuate cutting edge 11 (that is, chipping is the most likely to occur), and it becomes easier to ensure the cutting edge tip strength from the distalmost end P toward the outermost circumferential point S side along the edge length direction of the arcuate cutting edge 11 (that is, chipping is less likely to occur). Also, it has been confirmed that if chipping occurs to the distal end part of the arcuate cutting edge 11, chipping is also likely to occur in the chisel part 20 that continues to the distal end side of the arcuate cutting edge 11.

Therefore, by gradually reducing the curvature radius of the round honing from the distalmost end P toward the outermost circumferential point S side along the edge length direction of the arcuate cutting edge 11 as in the above configuration, it is possible, in the vicinity of the distal end part of the arcuate cutting edge 11, to ensure sufficient cutting edge tip strength while maintaining the precision of the worked surface and significantly prevent chipping in the region from the distal end part of the arcuate cutting edge 11 to the chisel part 20. In addition, in the region closer to the outermost circumferential point S side than the vicinity of the distal end part along the edge length direction of the arcuate cutting edge 11, it is possible to further improve the precision of the worked surface by gradually reducing the curvature radius of the round honing.

In the present embodiment, since the round honing is formed in the entire region in the edge length direction of the arcuate cutting edge 11, the effect is obtained in which chipping of the cutting edge tip can be prevented over the entire region in the edge length direction of the arcuate cutting edge 11, and it is possible to meet needs of various types of cutting modes.

Also, in the present embodiment, the tool cutting edge diameter D (mm) of the cutting insert 5 is 6 to 50 mm and the chisel thickness L1 (mm) along the width direction of the chisel part 20 satisfies $0.007 \times D \leq L1 \leq 0.024 \times D$, so that excellent precision of the worked surface can be maintained while improving chipping resistance properties in the vicinity of the chisel part 20.

Specifically, since the tool cutting edge diameter D (mm) of the cutting insert 5 is 6 to 50 mm and the chisel thickness L1 (mm) of the chisel part 20 is $0.007 \times D$ (mm) or more, the strength of the chisel part 20 is sufficiently enhanced and chipping of the chisel part 20 is more effectively prevented.

Also, since the tool cutting edge diameter D (mm) of the cutting insert 5 is 6 to 50 mm and the chisel thickness L1 (mm) of the chisel part 20 is $0.024 \times D$ (mm) or less, it is possible to keep the chisel part 20 from becoming excessively thick and the length of the chisel edge 21 from becoming excessively long, thereby preventing the chisel edge 21 from influencing the precision of the worked surface.

In the present embodiment, since the chisel intersection amount L2 of the chisel part 20 is 0.10 to 0.20 mm, it is possible to prevent chipping in the vicinity of the chisel part 20 while maintaining excellent precision of the worked surface of the workpiece.

Specifically, since the chisel intersection amount L2 is 0.10 mm or more, it is possible to ensure a sufficient capacity of the recess part (the pocket adjacent to the chisel part 20) for temporarily holding cutting chips discharged from the distal end part (the vicinity of the distalmost end P) of the arcuate cutting edge 11. As a result, even at the time of high efficiency machining, excellent performance of discharging cutting chips generated from the distal end part and the like of the arcuate cutting edge 11 is maintained, and chipping in the vicinity of the chisel part 20 due to chip clogging is prevented.

Furthermore, since the chisel intersection amount L2 is 0.20 mm or less, it is possible to keep the length of the chisel edge 21 together with the chisel intersection amount L2 from becoming excessively long, and to maintain excellent R precision of the arcuate cutting edge 11. Therefore, excellent precision of the worked surface of the workpiece can be maintained.

In the present embodiment, the clearance angles η, λ of the chisel edge 21 gradually become greater from the one arcuate cutting edge 11 (11A or 11B) of the pair of arcuate cutting edges 11 having the flank face 13 in common with the flank face 13 of the chisel edge 21, toward the other arcuate cutting edge 11 (11B or 11A) side along the ridge line direction. Therefore, the following action and effect can be achieved.

That is to say, in this case, during cutting processing, in the flank face 13 region of the chisel edge 21 (the area of the chisel part 20 adjacent to the side of the chisel edge 21 opposite to the tool rotation direction R), the clearance angles η, λ of the chisel edge 21 decrease from the center axis C toward the end edge side of the chisel edge 21 (that is, toward the distalmost end P) along the ridge direction of the chisel edge 21. That is to say, in the chisel edge 21, as it gets closer to the end edge in the ridge line direction where the circumferential velocity (the velocity about the center axis C) becomes faster at the time of cutting processing and the resistance received from the workpiece also tends to become greater, it is possible to ensure a large (thick) back metal in the flank face 13 region of the chisel edge 21. As a result, the strength of the chisel part 20 can be increased, thereby preventing chipping thereto.

In this case, in a rake face region of the chisel edge 21 (the area of the chisel part 20 adjacent to the chisel edge 21 in the tool rotation direction R), the rake angle of the chisel edge 21 decreases from the center axis C toward the end edge (the distalmost end P) side of the chisel edge along the ridge direction of the chisel edge 21. That is to say, in the chisel edge 21, as it gets closer to the end edge in the ridge line direction where the circumferential velocity becomes faster at the time of cutting processing and the resistance received from the workpiece also tends to become greater, resistance of the rake face of the chisel edge 21 can be kept small, and as a result, influence on the precision of the worked surface can be suppressed.

In the present embodiment, the angle ζ formed between the ridge line part 22 and the ridge line part 25 forms an acute angle in the insert front view shown in FIG. 12.

Therefore, when manufacturing the cutting insert 5, the processing at the time of forming the vicinity of the chisel part 20 (the recess part 26 in particular) can be made easier, and it is possible to ensure a wider restraining area of the cutting insert 5 when attaching the cutting insert 5 to the slit-like mounting seat 3 (the insert fitting groove 7) formed at the distal end part 2 in the center axis C direction of the tool main body 1.

In the present embodiment, since the clearance angle at the distal end part of the arcuate cutting edge 11 is less than 15°, it is possible to ensure a large back metal in the flank face 13 region at the distal end part of the arcuate cutting edge 11 (that is to say, rigidity can be increased), and the cutting edge strength of the distal end part is improved.

In order to make the above action and effect exceptionally excellent, it is preferable that the clearance angle at the distal end part of the arcuate cutting edge 11 is 11° or less.

Also, in the present embodiment, since the helical angle ε at the outermost circumferential point S of the arcuate cutting edge 11 is 26° to 32°, rigidity of the cutting insert 5 can be ensured while maintaining excellent cutting chip discharge performance and increasing the precision of cutting.

Specifically, by making the helical angle ε at the outermost circumferential point S of the arcuate cutting edge 11 26° or more, cutting performance in the vicinity of the outermost circumferential point S of the arcuate cutting edge 11 is enhanced and cutting chips generated in cutting performed in the vicinity of the outermost circumferential point S can be easily discharged toward the proximal end side in the center axis C direction. Therefore, excellent cutting chip discharge performance is maintained, and the precision of the worked surface is stably improved.

In addition, by making the helical angle ε at the outermost circumferential point S of the arcuate cutting edge 11 32° or less, it is possible to keep thrust force (force toward the proximal end side in the center axis C direction) acting on the cutting insert 5 during cutting processing from becoming excessively large, and it is possible to ensure a large back metal of the cutting edge 4. As a result, chatter vibrations and the like caused by a large thrust force at the time of cutting processing can be effectively suppressed and the precision of the worked surface can be improved, while increasing the rigidity of the cutting insert 5 and preventing chipping or cracking therein.

Moreover, in the present embodiment, since the most protruding point Q that protrudes most toward the tool rotation direction R of the arcuate cutting edge 11 is arranged in a range where the radial angle θ is 30° to 47°, cutting resistance can be kept small and excellent cutting chip discharge performance can be maintained, thereby improving the precision of the worked surface.

Specifically, in the arcuate cutting edge 11, since the most protruding point Q toward the tool rotation direction R is arranged in the range where the radial angle θ is 30° or more, it is possible, as shown in FIG. 10, to prevent the rake angle in the axial direction from becoming excessively large toward the negative angle side in the region from the distalmost end P to the most protruding point Q along the edge length direction of the arcuate cutting edge 11. As a result, it is possible to keep cutting resistance small in the vicinity of the distal end part of the arcuate cutting edge 11, and, at the same time, it is possible to suppress clogging of cutting chips and maintain excellent cutting chip discharge performance.

Furthermore, in the arcuate cutting edge 11, since the most protruding point Q toward the tool rotation direction R is arranged in the range where the radial angle θ is 47° or less, the region from the distalmost end P to the most protruding point Q along the edge length direction of the arcuate cutting edge 11, that is, the region where the rake angle in the axial direction is a negative angle, can be kept short, and it is effective for reducing cutting resistance. Also, the region from the most protruding point Q to the outermost circumferential point S along the edge length direction of the arcuate cutting edge 11, that is, the region where the axial rake angle is a positive angle, can be ensured long, and it is effective for improving cutting chip discharge performance. That is to say, cutting performance in the region from the most protruding point Q to the outermost circumferential point S of the arcuate cutting edge 11 can be improved, and at the same time, cutting chips generated in the above region can be easily discharged toward the proximal end side in the center axis C direction. Therefore, excellent cutting chip discharge performance is maintained, and the precision of the worked surface is stably improved.

Also, in the present embodiment, when the value of the radial rake angle δ at the radial angle θ of 0° is α, the value of the radial rake angle δ at the radial angle θ of 90° is β, and the value of the radial rake angle δ at the most protruding point toward the tool rotation direction of the arcuate cutting edge 11 is γ, the radial rake angle δ of the arcuate cutting edge 11 satisfies a relationship β<α≤γ. Therefore, it is possible to improve the performance of biting into the workpiece while suppressing chatter vibrations, and to improve the precision of the worked surface while ensuring the strength of the cutting edge.

Specifically, by making the radial rake angle δ of the arcuate cutting edge 11 satisfy the relation β<α, cutting resistance in the vicinity of the distalmost end P of the arcuate cutting edge 11 is reduced to increase the performance of biting into the workpiece, and also, sufficient cutting edge strength can be ensured in the vicinity of the outermost circumferential point S of the arcuate cutting edge 11 where the thickness of the cutting chips increases.

Furthermore, by making the radial rake angle δ of the arcuate cutting edge 11 satisfy the relationship of α≤γ, it is possible to keep cutting resistance small at the most protruding point Q in the tool rotation direction R of the arcuate cutting edge 11 that comes in contact first with the workpiece. As a result, it is possible to enhance the performance of biting into the workpiece, suppress chatter vibrations, and improve the precision of the worked surface.

Also, since the maximum value of the radial rake angle δ is set in the range where the radial angle θ is 20° to 40°, the maximum value of the radial rake angle δ of the arcuate cutting edge 11 can be easily arranged in the region from the vicinity of the distal end part to the most protruding point Q along the edge length direction of the arcuate cutting edge 11.

More specifically, the arcuate cutting edge 11 comes in contact first with the workpiece at the most protruding point Q in the tool rotation direction R, and thereafter the region of contact with the workpiece expands toward the distalmost end P side and the outermost circumferential point S side along the edge length direction of the arcuate cutting edge 11. That is to say, on the distalmost end P side to the most protruding point Q along the edge length direction of the arcuate cutting edge 11, the axial rake angle of the arcuate cutting edge 11 is a negative angle, and on the outermost circumferential point S side to the most protruding point Q, the axial rake angle of the arcuate cutting edge 11 is a positive angle.

Therefore, if the radial rake angle S is set to the maximum value in the region from the vicinity of the distal end part to the most protruding point Q along the edge length direction of the arcuate cutting edge 11 (that is, a cutting edge in which cutting performance is enhanced to the highest level), the cutting resistance is reduced while maintaining the axial rake angle of the region as a negative angle, and excellent cutting performance can be maintained.

In addition, since the radial rake angle δ is gradually reduced (continuously decreases) from the most protruding point Q to the outermost circumferential point S of the arcuate cutting edge 11 in the tool rotation direction R, it is possible to ensure sufficient strength of the cutting edge tip on the outermost circumferential point S side where the thickness of the cutting chips tends to be thick in the arcuate cutting edge 11.

In the present embodiment, the curvature radius of the round honing of the arcuate cutting edge 11 gradually decreases from the most protruding point Q toward the outermost circumferential point S side along the edge length direction of the arcuate cutting edge 11. Therefore, as described above, even if the radial rake angle δ is gradually reduced from the most protruding point Q to the outermost circumferential point S of the arcuate cutting edge 11, excellent cutting performance of the arcuate cutting edge 11 on the outermost circumferential point S side is also maintained.

Also, in the present embodiment, when, of both faces facing in the thickness direction of the cutting insert 5, the face facing the same direction as the rake face of the cutting edge 4 is treated as a front face, and the face facing in a direction opposite to the rake face is treated as a back face, a distance T2 from the outermost circumferential point S to the back face along the thickness direction is greater than a distance T1 from the outermost circumferential point S of the arcuate cutting edge 11 to the front face along the thickness direction, and the following action and effect can be achieved.

That is to say, in this case, even in the vicinity of the outermost circumferential point S and the vicinity of the outer circumferential cutting edge 9 where the back metal tends to be thin on the arcuate cutting edge 11, it is possible to ensure a sufficient thickness of the back metal and improve the rigidity of the cutting insert 5. As a result, it is possible to effectively prevent chipping of the cutting edge in the vicinity of the outermost circumferential point S and the vicinity of the outer circumferential cutting edge 9 of the arcuate cutting edge 11, or cracking and the like in the cutting insert 5.

The present invention is not limited to the embodiment described above, and various modifications can be made without departing from the scope of the invention.

For example, in the embodiment described above, the screw insertion hole 18 is formed in the cutting insert 5, but the cutting insert 5 may not have the screw insertion hole 18 formed therein. In this case, the cutting insert 5 is detachably attached to the mounting seat 3 of the tool main body 1 by means of a clamp mechanism or the like.

Also, in the embodiment described above, the round honing of the arcuate cutting edge 11 is formed over the entire region in the edge length direction of the arcuate cutting edge 11, but the invention is not limited thereto. That is to say, it is sufficient that the round honing of the arcuate cutting edge 11 is formed at least in the range where the radial angle θ is 30° or less.

Also, in the embodiment described above, the tool cutting edge diameter D (mm) of the cutting insert 5 is 6 to 50 mm and the chisel thickness L1 (mm) of the chisel part 20 satisfies 0.007×D≤L1≤0.024×D, but the invention is not limited thereto. However it is more preferable when the chisel thickness L1 is within the above numerical range with respect to the tool cutting edge diameter D, because the effect of enhancing the chipping resistance property in the vicinity of the chisel part 20 while maintaining excellent precision of the worked surface of the workpiece can be made exceptionally excellent. It is even more preferable that the chisel thickness L1 (mm) of the chisel part 20 satisfies 0.013×D≤L1≤0.024×D when the tool cutting edge diameter D (mm) is 6 to 10 mm; it is even more preferable that the chisel thickness L1 (mm) of the chisel part 20 satisfies 0.009×D≤L1≤0.017×D when the tool cutting edge diameter D (mm) exceeds 10 mm and is 25 mm or less; and it is even more preferable that the chisel thickness L1 (mm) of the chisel part 20 satisfies 0.007×D≤L1≤0.011×D when the tool cutting edge diameter D (mm) exceeds 25 mm and is 50 mm or less. However, the invention is not limited to this.

In order to make the above effect of preventing chipping in the vicinity of the chisel part 20 while maintaining excellent precision of the worked surface of the workpiece even more exceptional, it is more preferable that, according to the tool cutting edge diameter D, the chisel thickness L1 of the chisel part 20 is set as described below. That is to say, when the tool cutting edge diameter D is 25 mm, the chisel thickness L1 is preferably 0.225 to 0.275 mm, more preferably 0.230 to 0.270 mm, and still more preferably 0.235 to 0.265 mm. When the tool cutting edge diameter D is 30 mm, the chisel thickness L1 is preferably 0.240 to 0.280 mm. When the tool cutting edge diameter D is 20 mm, the chisel thickness L1 is preferably 0.200 to 0.240 mm. When the tool cutting edge diameter D is 16 mm, the chisel thickness L1 is preferably 0.170 to 0.210 mm. The chisel thickness L1 corresponding to the tool cutting edge diameter D (mm) is not limited to the above ranges.

In the embodiment described above, the chisel intersection amount L2 of the chisel part 20 is 0.10 to 0.20 mm, but is not limited thereto. However, it is more preferable when the chisel intersection amount L2 is within the above numerical range, because the effect of preventing chipping in the vicinity of the chisel part 20 while maintaining excellent precision of the worked surface of the workpiece can be made exceptionally excellent.

In addition to the range of the chisel intersection amount L2 of the chisel part 20, by setting the tool cutting edge diameter D of the cutting insert 5 to a predetermined range, the above effect of preventing chipping in the vicinity of the chisel part 20 while maintaining excellent precision of the worked surface of the workpiece can be made even more exceptional.

For example, when the tool cutting edge diameter D is 8 mm to 30 mm, the chisel intersection amount L2 is preferably 0.10 to 0.20 mm, more preferably 0.12 to 0.19 mm, and still more preferably 0.14 to 0.18 mm.

In embodiment described above, in the insert front view shown in FIG. 12, the angle formed between the ridge line part 22 and the ridge line part 25 forms an acute angle, but the invention is not limited thereto.

Figure 16:
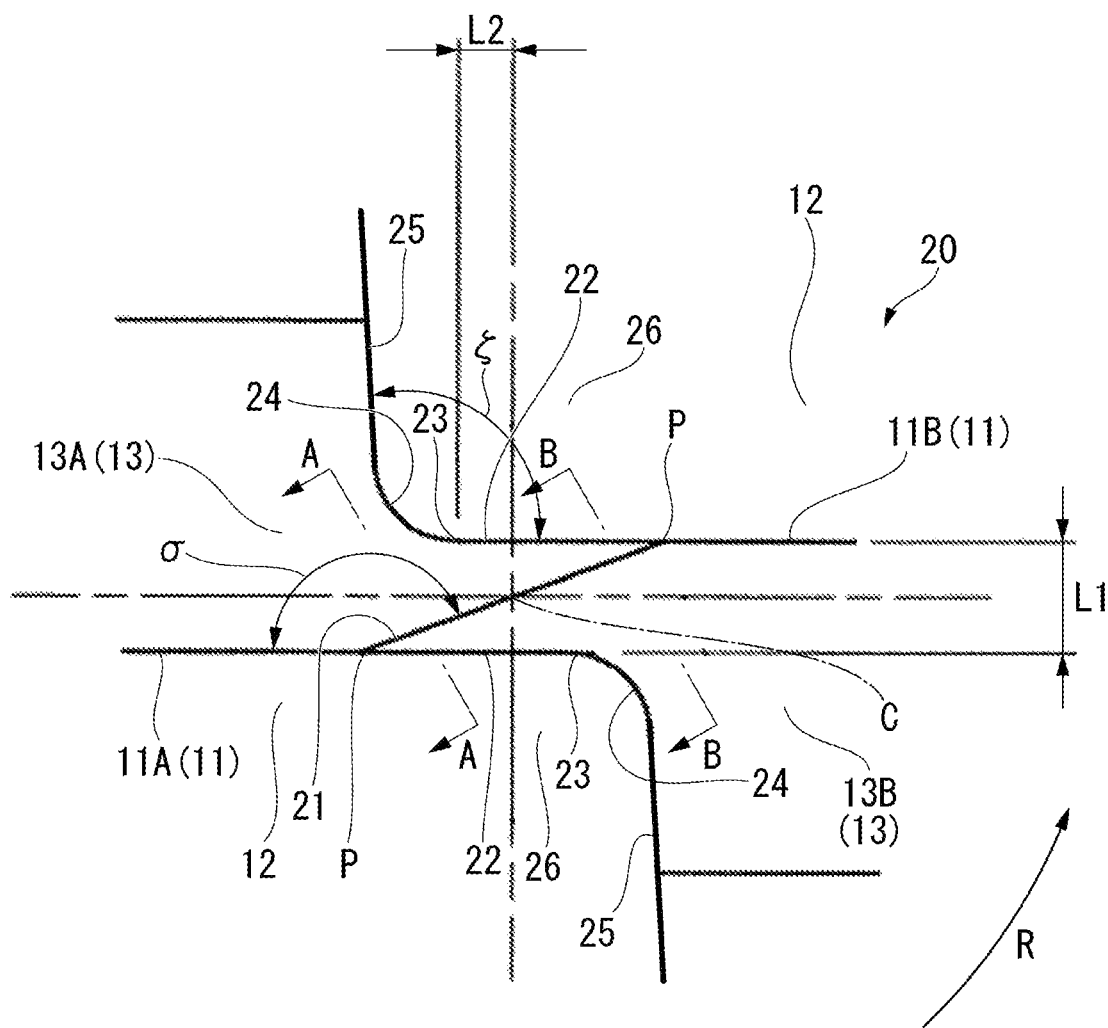
FIG. 16 is an enlarged view showing a modified example of the chisel part of the cutting insert.

FIG. 16 shows a modified example of the chisel part 20 of the cutting insert 5 described in the above embodiment. In this modified example, in the insert front view, the angle formed between the ridge line part 22 and the ridge line part 25 forms an acute angle or a right angle. In this case, a large capacity of the recess part 26 (cutting chip discharge pocket) surrounded by the ridge line parts 22, 25 and the chisel R part 24 is ensured and excellent cutting chip discharge performance is maintained, thereby effectively preventing cutting chip clogging. As a result, the effect of preventing chipping in the vicinity of the chisel part 20 while enhancing the precision of the worked surface of the workpiece becomes exceptional.

Note that the A-A cross section and the B-B cross section in the modified example of the FIG. 16 are the same as those of FIG. 13 and FIG. 14 respectively.

In embodiment described above, the clearance angle at the distal end part of the arcuate cutting edge 11 is less than 15°, but is not limited thereto. However, it is more preferable when the clearance angle of the distal end part of the arcuate cutting edge 11 is within the above numerical range, because the back metal in the area of the flank face 13 can be made sufficiently thick at the distal end part of the arcuate cutting edge 11 and the strength of the cutting edge at the distal end part can be exceptionally improved. The lower limit value of the clearance angle at the distal end part of the arcuate cutting edge 11 is not particularly limited, but it is preferable to set the clearance angle to 7° or more.

Moreover, in embodiment described above, the helical angle ε at the outermost circumferential point S of the arcuate cutting edge 11 is 26° to 32°, but is not limited thereto. However, it is more preferable when the helical angle ε at the outermost circumferential point S of the arcuate cutting edge 11 is in the above numerical range, because the effect of ensuring rigidity of the cutting insert 5 while maintaining excellent cutting chip discharge performance and increasing cutting precision is made exceptionally excellent. The helical angle ε at the outermost circumferential point S of the arcuate cutting edge 11 is more preferably 26° to 30°, and even more preferably 26° to 28°, but is not limited thereto.

Furthermore, in the embodiment described above, the most protruding point Q oriented in the tool rotation direction R of the arcuate cutting edge 11 is arranged in a range where the radial angle θ is 30° to 47°, but the invention is not limited thereto. However, it is more preferable when the most protruding point Q of the arcuate cutting edge 11 is arranged in the range where the radial angle θ is 30° to 47°, because the effect of keeping the cutting resistance small while maintaining excellent cutting chip discharge performance and improving the precision of the worked surface is made exceptionally excellent. The most protruding point Q is more preferably arranged in a range where the radial angle θ is 35° to 47°, and even more preferably in a range of 40° to 47°, but the invention is not limited thereto.

Also, in the embodiment described above, when the value of the radial rake angle δ at the radial angle θ of 0° is α, the value of the radial rake angle δ at the radial angle θ of 90° is β, and the value of the radial rake angle δ at the most protruding point toward the tool rotation direction of the arcuate cutting edge 11 is γ, the radial rake angle δ of the arcuate cutting edge 11 satisfies a relationship β<α≤γ, but the invention is not limited thereto. However, it is more preferable when the above relationship is satisfied, because the effect of improving the performance of biting into the workpiece while suppressing chatter vibrations, and improving the precision of the worked surface while ensuring the strength of the cutting edge, is made exceptionally excellent.

Furthermore, in the embodiment described above, the maximum value of the radial rake angle δ is set in the range where the radial angle θ is 20° to 40°, but the invention is not limited thereto. However, it is more preferable when the maximum value of the radial rake angle δ is set in the range where the radial angle θ is 20° to 40°, because there is an exceptionally excellent effect where the maximum value of the radial rake angle δ can be easily arranged in the region from the vicinity of the distal end part to the most protruding point Q along the edge length direction of the arcuate cutting edge 11, and the cutting resistance is reduced despite the axial rake angle of the region being a negative angle, and excellent sharpness can be maintained. It is more preferable that the maximum value of the radial rake angle δ is set in a range where the radial angle θ is 20° to 35°, and even more preferably in a range of 20° to 30°, but it is not limited thereto.

In the embodiment described above, the cutting edge-interchangeable ball end mill 6 has been described as an example of the cutting edge-interchangeable rotary cutting tool, but the invention is not limited thereto. That is to say, it is sufficient that the cutting edge-interchangeable rotary cutting tool includes, as the cutting edges 4 of the cutting insert 5, at least the arc-shaped arcuate cutting edges 11 that protrude toward the distal end outer circumferential side of the cutting insert 5, and the shape of the outer circumferential cutting edge 9 is not particularly limited.

Specifically, for example, the outer circumferential cutting edge 9 may come into contact with the outermost circumferential end (outermost circumferential point) S of the arcuate cutting edge 11 and may extend toward the radially outer side and the side opposite to the tool rotation direction R as it gets closer to the proximal end side in the center axis C direction. In this case, the rotation locus about the center axis C of the outer circumferential cutting edge 9 is, for example, of a truncated cone shape that gradually increases in diameter toward the proximal end side in the center axis C direction, or of a tapered barrel shape that expands radially outward. Therefore, in this case, the cutting edge-interchangeable rotary cutting tool is a cutting edge-interchangeable tapered ball end mill or a variant tool that is cutting edge-interchangeable.

However, as described in the above embodiment, it is more preferable when the rotation locus about the center axis C of the outer circumferential cutting edge 9 is formed in a cylindrical surface shape (that is, when the radial distance between the outer circumferential cutting edge 9 and the center axis C is constant along the center axis C direction), because a large margin can be ensured for re-polishing without changing the cutting edge diameter (the maximum diameter) of the cutting edges 4.

Also, as the cutting edge 4 of the cutting insert 5, there may be provided a cutting edge portion other than the arcuate cutting edge 11 and the outer circumferential cutting edge 9. Furthermore, the outer circumferential cutting edge 9 need not be provided in the cutting edge 4.

In the embodiment described above, in addition to cemented carbide containing tungsten carbide and cobalt, for example, a ceramic composed of cermet, high speed steel, titanium carbide, silicon carbide, silicon nitride, aluminum nitride, aluminum oxide, or a mixture of these, a cubic boron nitride sintered body, a diamond sintered body, or an ultra high pressure sintered body, in which a hard phase composed of polycrystalline diamond or cubic boron nitride and a binder phase of a ceramic or an iron group metal are sintered under a ultra high pressure, may be used as the material of the base body of the cutting insert 5 (insert main body 15).

Moreover, for the tool main body 1, in addition to manufacturing it with an alloy tool steel such as SKD61, a tool main body formed by joining an alloy tool steel such as SKD 61 and a cemented carbide may be used.

In addition, the respective configurations (constituent elements) described in the embodiment, the modified example, and the explanatory notes mentioned above may be combined without departing from the scope of the invention, and also, additions, omissions, substitutions, and other changes of the configurations are possible.

Furthermore, the present invention is not limited by the embodiment described above, but is limited only by the claims.

Working Examples

Hereinafter, the present invention will be specifically described with reference to working examples. However, the present invention is not limited to these working examples.

The cutting edge-interchangeable ball end mills 6 each provided with the cutting insert 5 of the above embodiment are prepared as Working Examples 1 to 5 of the present invention. The cutting edge-interchangeable ball end mills each provided with a cutting insert of a configuration different from that of the present invention are prepared as conventional Comparative Examples 1 to 7. The specifications of these cutting edge-interchangeable ball end mills are shown in Table 1 below.

Here, configurations common to Working Examples 1 to 5 of the present invention and Comparative Examples 1 to 7 are: the helical angle ε at the outermost circumferential point of the arcuate cutting edge is 26°; the radial angle θ at the most protruding point Q of the arcuate cutting edge is 45°; the radial rake angle δ of the arcuate cutting edge satisfies the relation β<α≤γ; and the maximum value of the radial rake angle δ is set in a range where the radial angle θ is 20° to 40°.

Prior to the cutting test, the R precision of the arcuate cutting edges of new cutting inserts was measured using each cutting edge-interchangeable ball end mill. The evaluation method at that time was as follows.

Measuring device: Model Helicheck (registered trademark) NC4 Type model manufactured by WALTER Measuring location: Cutting edge of cutting insert Evaluation criterion: Within the range of ±5 μm with respect to the desired hemispherical surface (predetermined hemispherical surface)

Next, the cutting test was carried out to evaluate the tool life under the following cutting conditions, using each cutting edge-interchangeable ball end mill.

<Cutting Conditions>

Workpiece material: SKD11, 60HRC

Processing form: scanning line processing (reciprocating) by intermittent processing on the surface of a workpiece having 12 grooves each having a width of 10 mm Machine used: Vertical machining center BT50 Type Coolant: Dry (air blow)

Cutting speed: Vc=314 m/min

Main shaft rotation speed: n=4,000 min-1

Feed rate per one cutting edge: fz=0.7 mm/t

Table feed rate: Vf=5,600 mm/min

Axial cut depth: ap=0.5 mm

Radial cut width: ae=1 mm

Tool cutting edge diameter: φ25 mm

Tool protrusion: OH=183 mm

The evaluation of "tool life" by the above cutting test was carried out by evaluating the chipping state of the cutting edge. A plurality (three or more) of cutting inserts were tested (were subjected to the above cutting test), and a "GOOD" was given if no chipping was found in the cutting edge, a "PASS" was given if chipping was partially found, and a "FAIL" was given if multiple instances of chipping occurred. More specifically, three cutting inserts were tested, and evaluations were made in the following manner: a "GOOD" was given if no cutting inserts had chipping; a "PASS" was given if one or two cutting inserts had chipping; and a "FAIL" was given if three cutting inserts had chipping.

Regarding the evaluation of the cutting chip discharge performance, cutting states in the above cutting test were image-captured using a high-speed camera and the qualities were judged by observing the slow reproduction image thereof. Specifically, a "NORMAL" was given if a trace of slight contact with cutting chips was found on the chisel R part 24, and an "EXCELLENT" was given if no trace of contact with cutting chips was found at all on the chisel R part 24.

The evaluation results of the R precision of the arcuate cutting edge and the evaluation results of the cutting test (chipping state of cutting edge and cutting chip discharge performance) are shown in Table 1 below. "Judgment" of "Evaluation result" in Table 1 was made, using the following criteria.

AA The R precision of the arcuate cutting edge was within the range of ±5 μm, the evaluation of "tool life" (cutting edge chipping state) was "GOOD", and the evaluation of cutting chip discharge performance was "EXCELLENT" when cutting chip discharge performance was observed.

A The R precision of the arcuate cutting edge was within the range of ±5 μm, the evaluation of "tool life" was "GOOD", and the evaluation of cutting chip discharge performance in observation was "NORMAL" (standard).

B The R precision of the arcuate cutting edge was within the range of ±5 μm, the evaluation of "tool life" was "PASS", and the evaluation of cutting chip discharge performance in observation was "NORMAL" (standard).

C The R precision of the arcuate cutting edge was out of the range of ±5 μm, and the evaluation of "tool life" was "FAIL" or the evaluation of cutting chip discharge performance in observation was "BAD" (standard).

TABLE 1

|  | Arcuate cutting edge round honing curvature radius (μm) | Chisel angle (°) | Arcuate cutting edge round honing continuous reduction from distalmost end to outermost circumferential point | Chisel thickness (mm) | Chisel intersection amount (mm) | Arcuate cutting edge distal end clearance angle (°) | Arcuate cutting edge outermost circumferential point helical angle (°) | Arcuate cutting edge outermost circumferential point radial angle (°) | Radial rake angle satisfies $\beta < \alpha \leq \gamma$ |
|---|---|---|---|---|---|---|---|---|---|
| Example 1 | 30 | 156 | Applicable | 0.175 | 0.15 | 11 | 26 | 45 | Applicable |
| Example 2 | 30 | 156 | Applicable | 0.275 | 0.15 | 11 | 26 | 45 | Applicable |
| Example 3 | 30 | 156 | Applicable | 0.250 | 0.15 | 11 | 26 | 45 | Applicable |
| Example 4 | 30 | 156 | Applicable | 0.225 | 0.15 | 11 | 26 | 45 | Applicable |
| Example 5 | 30 | 156 | Applicable | 0.275 | 0.15 | 11 | 26 | 45 | Applicable |
| Comparative Example 1 | 10 | 162 | Not applicable | 0.275 | 0.25 | 11 | 26 | 45 | Applicable |
| Comparative Example 2 | 10 | 156 | Not applicable | 0.250 | 0.25 | 11 | 26 | 45 | Applicable |
| Comparative Example 3 | 10 | 162 | Not applicable | 0.225 | 0.25 | 11 | 26 | 45 | Applicable |
| Comparative Example 4 | 10 | 136 | Not applicable | 0.300 | 0.25 | 11 | 26 | 45 | Applicable |
| Comparative Example 5 | 10 | 136 | Not applicable | 0.250 | 0.25 | 11 | 26 | 45 | Applicable |
| Comparative Example 6 | 10 | 162 | Not applicable | 0.300 | 0.25 | 11 | 26 | 45 | Applicable |
| Comparative Example 7 | 10 | 162 | Not applicable | 0.175 | 0.15 | 15 | 26 | 45 | Applicable |

|  | Max value of radial rake angle for radial angle 20-40° | Angle and value (°) |  | Evaluation results |  |  |  |
|---|---|---|---|---|---|---|---|
|  |  |  |  | Evaluation 1 R precision of arcuate cutting edge shape | Evaluation 2 Cutting edge chipping state | Evaluation 3 Cutting chip discharge performance | Judgment |
| Example 1 | Applicable | Acute | 86 | ±5 μm | Pass | Normal | B |
| Example 2 | Applicable | Acute | 86 | ±5 μm | Good | Normal | A |
| Example 3 | Applicable | Acute | 86 | ±5 μm | Good | Normal | A |
| Example 4 | Applicable | Acute | 86 | ±5 μm | Good | Normal | A |
| Example 5 | Applicable | Obtuse | 110 | ±5 μm | Good | Excellent | AA |
| Comparative Example 1 | Applicable | Acute | 86 | ±8 μm | Fail | Standard | C |
| Comparative Example 2 | Applicable | Acute | 86 | ±5 μm | Fail | Standard | C |
| Comparative Example 3 | Applicable | Acute | 86 | ±6 μm | Fail | Standard | C |
| Comparative Example 4 | Applicable | Acute | 86 | +5 μm | Fail | Standard | C |
| Comparative Example 5 | Applicable | Acute | 86 | ±5 μm | Fail | Standard | C |
| Comparative Example 6 | Applicable | Acute | 86 | ±8 μm | Fail | Standard | C |
| Comparative Example 7 | Applicable | Acute | 86 | ±5 μm | Fail | Standard | C |

As shown in Table 1, Working Examples 1 to 4 had evaluation results of A or B. In other words, strengthening was achieved in the distal end part of the cutting edge ridge line (cutting edge tip) of the arcuate cutting edge 11, and the R precision of the cutting edge ridge line was also maintained within the range of ±5 µm, yielding excellent results.

In particular, in Working Examples 2 to 4 in which the chisel intersection amount L2 was 0.10 to 0.20 mm, further improvement was observed in chipping resistance properties, and clogging of cutting chips at the distal end part of the cutting edge ridge line was avoided, yielding an evaluation result A for these examples.

Working Example 5 had an evaluation result of AA. The reason for this was that the evaluation of cutting chip discharge performance was "EXCELLENT" in the cutting chip discharge performance observation, and the effect of improvement was confirmed. Working Example 5 had the basic configuration of Working Example 2, which earned an evaluation "A". Furthermore it had the angle value at the cutting edge distal end part set to an obtuse angle of 110°. Therefore, it is considered that a larger capacity was ensured for the cutting chip discharge pocket (the recess part 26), and excellent cutting chip discharge performance was maintained to prevent clogging of cutting chips. In Working Examples 1 to 4 and Comparative Examples 1 to 7, the angle value was set to an acute angle of 86°, and consequently yielded a worse result in the observation of cutting chip discharge performance compared to Working Example 5. However, almost no clogging of cutting chips was found at the distal end part of the arcuate cutting edge, and the state of cutting chip discharge performance was normal (standard).

On the other hand, Comparative Examples 1 to 7 all yielded evaluation results of C. The reason for this was that the R precision did not meet the reference value ±5 µm, or that chipping occurred due to insufficient strength of the distal end part the cutting edge ridge line of the arcuate cutting edge.

In Comparative Examples 1 to 3, clogging of cutting chips did not occur at the distal end part of the cutting edge ridge line of the arcuate cutting edge because of the large chisel intersection amount. However, a number of instances of chipping occurrence were observed in the cutting edge distal end part. The reason for this is thought to be insufficient strength in the distal end part of the cutting edge.

In Comparative Example 2, although the chisel angle and the chisel thickness thereof were the same as those in Working Example 3, large chipping occurred therein. The reason for this is thought to be that the curvature radius of the round honing of the arcuate cutting edge was 10 µm, which is small, and therefore, the strength of the distal end part of the cutting edge ridge line was insufficient.

In Comparative Examples 4 and 5, the R precision satisfied the reference value ±5 µm, however, chipping still occurred. The reason for this is also thought to be that the curvature radius of the round honing of the arcuate cutting edge was 10 µm, which is small, and therefore, the strength of the distal end part of the cutting edge ridge line was insufficient.

In Comparative Example 6, the R precision was ±8 µm, which did not satisfy the reference value. In Comparative Example 7, the strength of the distal end part of the cutting edge of the arcuate cutting edge was insufficient, and chipping occurred.

INDUSTRIAL APPLICABILITY

The cutting insert and the cutting edge-interchangeable rotary cutting tool of the present invention are capable, even when used for high efficiency machining on a high hardness material, of maintaining excellent precision of the worked surface and preventing chipping, thereby prolonging the life of the tool. The invention therefore possesses industrial applicability.

REFERENCE SYMBOLS

1 Tool main body
2 Distal end part
3 Mounting seat
4 Cutting edge
5 Cutting insert
6 Cutting edge-interchangeable ball end mill (cutting edge-interchangeable rotary cutting tool)
11 Arcuate cutting edge (bottom cutting edge)
12 Rake face of arcuate cutting edge
13 Flank face of arcuate cutting edge
20 Chisel part
21 Chisel edge
22 Ridge line part
23 End edge of ridge line part
24 Chisel R part
25 Ridge line part
26 Recess part
C Center axis
F Predetermined point on arcuate cutting edge
L1 Chisel thickness
L2 Chisel intersection amount
O Arc center point
P Distalmost end of arcuate cutting edge
Pr Reference plane
Q Most protruding point
R Tool rotation direction
S Outermost circumferential point of arcuate cutting edge
T1, T2 Distance
VL Imaginary straight line
VS Imaginary plane
δ Radial rake angle (true rake angle)
ε Helical angle
ζ Angle at which ridge line part 22 and ridge line part 25 intersect
η, λ Clearance angle of chisel edge
θ Radial angle
σ Chisel angle

The invention claimed is:
1. A plate-shaped cutting insert detachably mounted on a distal end part of a tool main body that is rotated about a center axis, the cutting insert comprising:
rake faces;
flank faces; and
cutting edges formed on an intersecting ridge line between the rake faces and the flank faces,
wherein: the cutting edges each have an arcuate cutting edge that is of an arc shape protruding toward an outer circumference side of a distal end of the cutting insert;
the arcuate cutting edges are formed in a pair 180° rotationally symmetric about the center axis,
a chisel part is formed at an intersecting ridge line part between the flank faces of the pair of arcuate cutting edges;
when projecting, on a reference plane including a predetermined point on the arcuate cutting edge and the center axis, an imaginary straight line passing through an arc center point of the arcuate cutting edge and the predetermined point, an angle at which the imaginary straight line is inclined with respect to the center axis in the reference plane is defined as a radial angle;

a round honing is formed on a cutting edge tip of the arcuate cutting edge when the radial angle is less than or equal to 30°;

a curvature radius of the round honing in a cross section perpendicular to a cutting edge length direction of the arcuate cutting edge is 20 to 40 µm;

a chisel angle formed between the distal end part of the arcuate cutting edge and a chisel edge of the chisel part is 150° to 170° as seen in an insert front view of the cutting insert viewed from the distal end toward the proximal end side in the center axis direction;

the pair of the arcuate cutting edges are connected to both ends of the chisel edge in the ridge line direction, and a clearance angle of the chisel edge gradually becomes greater from one arcuate cutting edge of the pair of arcuate cutting edges having a flank face in common with the flank face of the chisel edge, toward the other arcuate cutting edge along the ridge line direction.

2. The cutting insert according to claim 1, wherein the curvature radius of the round honing gradually decreases from a distalmost end toward an outermost circumferential point side along the edge length direction of the arcuate cutting edge.

3. The cutting insert according to claim 1, wherein the round honing is formed over an entire region in an edge length direction of the arcuate cutting edge.

4. The cutting insert according to claim 1,
wherein a tool cutting edge diameter D (mm) of the cutting insert is 6 to 50 mm, and as seen in the insert front view, a chisel thickness L1 (mm) along a width direction of the chisel part perpendicular to the edge length direction of the distal end part of the arcuate cutting edge satisfies 0.007×D≤L1≤0.024×D.

5. The cutting insert according to claim 1,
wherein, as seen in the insert front view, a linear ridge line part extending on an extension line of the arcuate cutting edge along the edge length direction of the distal end part of the arcuate cutting edge is formed on the chisel part, and a chisel intersection amount, which is a distance from an end edge on a side opposite to the distalmost end of the arcuate cutting edge in the ridge line part along the edge length direction to the central axis is 0.10 to 0.20 mm.

6. The cutting insert according to claim 1,
wherein a clearance angle at a distal end part of the arcuate cutting edge is less than 15°.

7. The cutting insert according to claim 1,
wherein a helical angle at an outermost circumferential point of the arcuate cutting edge is 26° to 32°.

8. The cutting insert according to claim 1, wherein the arcuate cutting edge is of an arc shape protruding in a tool rotation direction about the center axis, and a most protruding point of the arcuate cutting edge that protrudes most in the tool rotation direction is arranged in a range where the radial angle is 30 degree to 47 degree.

9. The cutting insert according to claim 8, wherein, in a virtual plane perpendicular to the reference plane and including the imaginary straight line, a true rake angle, which is an angle at which the rake face of the arcuate cutting edge is inclined with respect to the reference plane, is defined as a radial rake angle; the radial rake angle at a radial angle of 0 degree is greater than the radial rake angle at a radial angle of 90 degree and is less than or equal to the radial rake angle at the most protruding point; the maximum value of the radial rake angle is set to a range where the radial angle is 20 degree to 40 degree; and the radial rake angle gradually becomes smaller from the most protruding point toward an outermost circumferential point of the arcuate cutting edge.

10. The cutting insert according to claim 1,
wherein of both faces facing in a thickness direction of the cutting insert, a face facing the same direction as the rake face is treated as a front face, and a face facing in a direction opposite to the rake face is treated as a back face, and a distance from an outermost circumference point to the back face along the thickness direction is greater than a distance from an outermost circumference point of the arcuate cutting edge along the thickness direction to the front face.

11. A cutting edge-interchangeable rotary cutting tool comprising:
a tool main body that is rotated about a center axis;
a mounting seat formed at a distal end part in a direction of the center axis of the tool main body; and
a cutting insert that is detachably attached to the mounting seat and that has cutting edges;
wherein the cutting insert of claim 1 is used as the cutting insert.

12. The cutting insert according to claim 2, wherein the round honing is formed over the entire region in an edge length direction of the arcuate cutting edge.

13. The cutting insert according to claim 2,
wherein a tool cutting edge diameter D (mm) of the cutting insert is 6 to 50 mm, and as seen in the insert front view, a chisel thickness L1 (mm) along a width direction of the chisel part perpendicular to the edge length direction of the distal end part of the arcuate cutting edge satisfies 0.007×D≤L1≤0.024×D.

14. The cutting insert according to claim 2,
wherein, as seen in the insert front view, a linear ridge line part extending on an extension line of the arcuate cutting edge along the edge length direction of the distal end part of the arcuate cutting edge is formed on the chisel part, and a chisel intersection amount, which is a distance from an end edge on a side opposite to the distalmost end of the arcuate cutting edge in the ridge line part along the edge length direction to the central axis is 0.10 to 0.20 mm.

15. The cutting insert according to claim 2,
wherein a clearance angle at a distal end part of the arcuate cutting edge is less than 15°.

16. The cutting insert according to claim 2,
wherein a helical angle at an outermost circumferential point of the arcuate cutting edge is 26° to 32°.

17. The cutting insert according to claim 6,
wherein a helical angle at an outermost circumferential point of the arcuate cutting edge is 26° to 32°.

18. The cutting insert according to claim 2,
wherein the arcuate cutting edge is of an arc shape protruding in a tool rotation direction about the center axis, and a most protruding point of the arcuate cutting edge that protrudes most in the tool rotation direction is arranged in a range where the radial angle is 30° to 47°.

19. The cutting insert according to claim 2,
wherein of both faces facing in a thickness direction of the cutting insert, a face facing the same direction as the rake face is treated as a front face, and a face facing in a direction opposite to the rake face is treated as a back face, and a distance from an outermost circumference point to the back face along the thickness direction is greater than a distance from an outermost circumference point of the arcuate cutting edge along the thickness direction to the front face.

20. A cutting edge-interchangeable rotary cutting tool comprising:
   a tool main body that is rotated about a center axis;
   a mounting seat formed at a distal end part in a direction of the center axis of the tool main body; and
   a cutting insert that is detachably attached to the mounting seat and that has cutting edges;
   wherein the cutting insert of claim 2 is used as the cutting insert.

* * * * *